US010009385B2

(12) United States Patent
Lang et al.

(10) Patent No.: US 10,009,385 B2
(45) Date of Patent: Jun. 26, 2018

(54) METHOD AND SYSTEM FOR MANAGING SECURITY POLICIES

(71) Applicants: Ulrich Lang, San Diego, CA (US); Rudolf Schreiner, Falkensee (DE)

(72) Inventors: Ulrich Lang, San Diego, CA (US); Rudolf Schreiner, Falkensee (DE)

( * ) Notice: Subject to any disclaimer, the term of this patent is extended or adjusted under 35 U.S.C. 154(b) by 0 days. days.

(21) Appl. No.: 15/629,170

(22) Filed: Jun. 21, 2017

(65) Prior Publication Data

US 2017/0289198 A1 Oct. 5, 2017

Related U.S. Application Data

(63) Continuation of application No. 15/232,136, filed on Aug. 9, 2016, now Pat. No. 9,692,792, which is a (Continued)

(51) Int. Cl.
*H04L 29/06* (2006.01)
*H04L 29/08* (2006.01)

(52) U.S. Cl.
CPC .......... *H04L 63/20* (2013.01); *H04L 63/0263* (2013.01); *H04L 63/10* (2013.01); *H04L 67/10* (2013.01)

(58) Field of Classification Search
CPC ..................................................... H04L 63/20
See application file for complete search history.

(56) References Cited

U.S. PATENT DOCUMENTS 3,920,965 A 11/1975 Sohrwardy
7,140,035 B1 11/2006 Karch
(Continued)

FOREIGN PATENT DOCUMENTS

EP 1650628 A2 4/2004

OTHER PUBLICATIONS

Burt et al., "Model Driven Security: Unification of Authorization Models for Fine-Grain Access Control", IEEE, Sep. 2003.
(Continued)

*Primary Examiner* — Shawnchoy Rahman
(74) *Attorney, Agent, or Firm* — Muncy, Geissler, Olds & Lowe, P.C.

(57) ABSTRACT

A policy management system includes a policy management device that is configured to manage a policy input and/or a template and/or a functional model, a policy enforced device that is directly or indirectly connected to the policy management device via a network and that is configured such that at least a part of the functional model managed by the policy management device reflects the functional features/behaviors of the policy enforced device, a policy enforcement device that is configured to execute policy enforcement on the policy enforced device, and a policy decision device that is configured to receive machine-enforceable rule and/or configuration from the policy management device. The policy enforcement device, when a policy relevant event occurs, instructs the policy decision device to determine the result of the condition of the transmitted machine-enforceable rule and/or configuration for implementing the policy input for the policy enforced device, thereby modifying an operation of the policy enforced device or the policy enforcement device to execute the action.

20 Claims, 13 Drawing Sheets

Related U.S. Application Data continuation of application No. 14/697,230, filed on Apr. 27, 2015, now Pat. No. 9,420,006, which is a continuation of application No. 12/126,711, filed on May 23, 2008, now Pat. No. 9,043,861.

(60) Provisional application No. 60/973,122, filed on Sep. 17, 2007, provisional application No. 60/991,890, filed on Dec. 3, 2007.

(56) References Cited

U.S. PATENT DOCUMENTS

| | | |
|---|---|---|
| 7,174,563 B1 | 2/2007 | Brownlie et al. |
| 7,464,367 B2 | 12/2008 | Wain et al. |
| 7,509,493 B2 | 3/2009 | Koti et al. |
| 7,546,629 B2 | 6/2009 | Albert et al. |
| 7,792,850 B1 | 9/2010 | Raffill et al. |
| 8,060,924 B2 | 11/2011 | Usov |
| 8,424,053 B2 | 4/2013 | Gottimukkala et al. |
| 8,620,635 B2 | 12/2013 | Rubin et al. |
| 8,924,335 B1 | 12/2014 | Trefler et al. |
| 2003/0084428 A1 | 5/2003 | Agostini et al. |
| 2004/0167984 A1 | 8/2004 | Herrmann |
| 2005/0096949 A1 | 5/2005 | Aiber et al. |
| 2005/0251853 A1 | 11/2005 | Bhargavan et al. |
| 2005/0283823 A1* | 12/2005 | Okajo ............... G06F 21/604 726/1 |
| 2006/0075465 A1 | 4/2006 | Ramanathan et al. |
| 2006/0101051 A1 | 5/2006 | Carr et al. |
| 2006/0246878 A1 | 11/2006 | Khoury |
| 2007/0113292 A1 | 5/2007 | Kao et al. |
| 2007/0136788 A1 | 6/2007 | Monahan et al. |
| 2008/0065466 A1 | 3/2008 | Liu et al. |
| 2008/0098453 A1 | 4/2008 | Hinton et al. |
| 2008/0262863 A1 | 10/2008 | Stickley et al. |
| 2010/0161362 A1 | 6/2010 | Shapira et al. |
| 2010/0287099 A1 | 11/2010 | Liu et al. |
| 2011/0093916 A1 | 4/2011 | Lang et al. |
| 2011/0314261 A1 | 12/2011 | Brucker et al. |
| 2013/0316774 A1 | 11/2013 | Lutnick et al. |
| 2014/0366085 A1 | 12/2014 | Lang et al. |
| 2015/0030305 A1 | 1/2015 | Moon |

OTHER PUBLICATIONS

Basin et al., "Model Driven Security: From UML Models to Access Control Infrastructures", ACM, vol. 15, No. 1, Jan. 2006, pp. 39-91.

Nakamaura et al., "Model-Driven Security Based on a Wed Services Security Architecture", Services Computing, IEEE International Conference, Jul. 2005.

Reznit et al., "Model Driven Development of Security Aspects", Electronic Notes in Theoretical Computer Science, Elsevier, vol. 163, No. 2, Apr. 2007, pp. 65-79.

Georgalas, Nektarios, et al. "MDA-driven development of standard-compliant OSS components: the OSS/J inventory case-study." (2004).

\* cited by examiner

OMG MDA layers

DAC-Rule Generation Example

MAC-Rule Generation Example

METHOD AND SYSTEM FOR MANAGING SECURITY POLICIES

This application is a Continuation application of U.S. Ser. No. 15/232,136, which was filed on Aug. 9, 2016, which is a Continuation application of U.S. Ser. No. 14/697,230, which was filed on Apr. 27, 2015, which was a Continuation application of U.S. Ser. No. 12/126,711, which was filed on May 23, 2008, which claims priority to U.S. Provisional Application No. 60/973,122 entitled "MODEL DRIVEN SECURITY: PARAMETERIZED GENERATION OF SECURITY POLICIES FROM FUNCTIONAL MODELS" filed Sep. 17, 2007, and U.S. Provisional Application No. 60/991,890 entitled "MODEL DRIVEN SECURITY: PARAMETERIZED GENERATION OF SECURITY POLICIES FROM FUNCTIONAL MODELS" filed Dec. 3, 2007, each being assigned to the assignee hereof and hereby expressly incorporated by reference herein.

BACKGROUND OF THE INVENTION

Field of the Invention

Embodiments of the invention relate to security policies within a computing system, and more particularly to a method and system of managing security policies within an information technology (IT) system.

Description of the Related Art

Information Technology (IT) systems require the definition and management of security policies. This includes access permissions between different applications or programs, between applications and files, between users and applications and/or files and other access control functionality at various layers of the application or network (e.g., IP packet filters, middleware layer access control, application layer access control, information filtering), Quality of Protection policies for confidentiality and integrity of communication using encryption or secure hash functions, or security policies enforced within the application itself, e.g. at the generation of sets or subsets of data. For example, a Service Oriented Architecture (SOA) is a computer systems architectural style for creating and using business processes, packaged as "services", throughout their lifecycle. SOA also defines and provisions the information technology (IT) infrastructure to allow different applications or services to exchange data and participate in business processes. These functions are loosely coupled with each other, with the operating systems and programming languages underlying the applications. SOA separates functions into distinct units (i.e., services), which can be distributed over a network and can be combined and reused to create business applications. These services communicate with each other by passing data from one service to another, or by coordinating an activity between two or more services.

FIG. 1 illustrates a conceptual diagram of an IT system 100 (e.g., a service oriented architecture (SOA) system, a data-centric system, an object-oriented system, a component-based system, a publish-subscribe oriented system, a transaction system, a database system, an information flow system, a workflow based system and a message oriented system, etc.). Reference will now be made to FIG. 1 to explain one example of authorization management in a SOA environment. Accordingly, conventional security or authorization management will now be described with reference of the IT system 100 of FIG. 1.

Referring to FIG. 1, the IT system 100 includes a policy node 105, a plurality of services 110, 115, 120 and 125, and a middleware bus 130. Each of services 110, 115, 120 and 125 are software objects that can operate throughout a distributed computing system. Each of services 110, 115, 120 and 125 can be physically embodied or executed at a single computing device, or alternatively at multiple computing devices throughout a computer network. Further, different services can be identified by one or more service identifiers, such as internet protocol (IP) addresses, object references, URLs or by a combination of a service interface and caller identity.

Communication between different services is mediated in the IT system 100 by the middleware bus 130. The middleware bus 130 is not a physical bus as one would find on a motherboard of a computer. Rather, the middleware bus 130 is computer software that connects software components or applications (i.e., services). The middleware bus 130 can be used to support complex, distributed applications. Structurally, the middleware bus 130 can be implemented by web servers, application servers, component servers, messaging servers and receivers, content management systems, Object Request Brokers, and/or similar tools that support application development and delivery. Middleware is typically used to support modern information technology based on extensible markup language (XML), SOAP, Web services, SOA, CORBA, Data Distribution Services (DDS), Message Oriented Middleware (MOM), transactions middleware etc. The middleware bus 130 sits "in the middle" between application software, such as services 110, 115, 120 and 125. The middleware bus 130 can for example be similar to the middle layer of a three-tier single system architecture, except that the middleware bus 130 can be "stretched" across multiple systems or applications.

Referring to FIG. 1, further connected to the middleware bus 130 is the policy node 105. The policy node 105 provides the middleware bus 130 or the application logic with the rules by which the middleware bus 130 enforces security for accesses between the services 110, 115, 120 and 125. This includes access control, encryption of the communications and logging of relevant events. In an example, the policy node 105 can be implemented as a single computer operated by a system administrator, but can alternatively be implemented in a distributed fashion. In addition to the definition and distribution of the security policy, the policy node 105 also receives and displays policy violations and other relevant events.

FIG. 2 illustrates a conventional security policy definition and enforcement process implemented within the IT system 100 of FIG. 1. Referring to FIG. 2, in 200, a system administrator operating the policy node 105 manually configures a plurality of "low-level" or machine-enforceable rules governing access permissions between services 110, 115, 120 and 125. Typically, the system administrator has a general security policy or concept in mind when configuring the low-level rules, for example the BellLaPadula security model to control information flow between services, role based access control, or a security intent described by a small number of high level rules. The low-level rules thereby become the means by which the general security policy is actually enforced within a particular computer network at all layers of the application stack (e.g. network layer encryption and filtering, middleware layer authorization, application layer authorization). As used herein, a "low-level" rule refers to a machine-enforceable rule, where a machine-enforceable rule is a rule with sufficient specificity to be applied at configuration/deployment time and/or run-time by the middleware bus 130 (e.g., "service 110 can access services 115 and 120, but not service 125", etc.) or other enforcement entity. For example, aside from the middleware layer, the low-level rules could also be enforced at the application layer, network, as a firewall, etc. Thus, while the example of FIG. 2 shows a middleware enforcement scheme, conventional enforcement schemes can be performed in an alternative fashion.

An example will now be provided wherein enforcement of access permissions, in a discretionary access control (DAC) scheme, is based on (i) a client identification, (ii) a target identification and (iii) an operation or access type identification (e.g., send, receive, etc.). For convenience of explanation, Table 1 (below) is limited to permissions regarding a "send" operation. As an example, the policy is expressed as OpenPMF Policy Definition Language (PDL) access control rules. In a similar manner, the rules could be used in other forms as well, e.g. in XACML.

TABLE 1

| Rule #1 | (client.name == 110)&(target.name == 115)&(operation.name == send): allow; |
| Rule #2 | (client.name == 115)&(target.name == 110)&(operation.name == send): allow; |
| Rule #3 | (client.name == 115)&(target.name == 120)&(operation.name == send): allow; |
| Rule #4 | (client.name == 125)&(target.name == 110)&(operation.name == send): allow; |
| Rule #5 | (client.name == 125)&(target.name == 115)&(operation.name == send): allow; |
| Rule #6 | (client.name == 125)&(target.name == 120)&(operation.name == send): allow; |

Accordingly, Table 1 (above) indicates that service 110 is permitted to send to service 115, service 115 is permitted to send to access services 110 and 120, service 120 has no access permission of other services and service 125 is permitted to send to services 110, 115 and 120.

Next, after the system administrator completes the manual configuration of low-level rules in 200, the policy node 105 distributes the low-level rules to the middleware bus 130 on each system and all other involved Policy Enforcement Points and security mechanisms. For example, the low-level rules can be distributed to the middleware bus 130 as a configuration for a "plug-in", such as in the form of a text-file indicating each service's associated access permissions (e.g., as in Table 1, above) or in any other predefined policy exchange format like XACML or OpenPMF's IDL (OMG Interface Definition Language) interface.

This security enforcement at the middleware bus includes, for example, access control at the sender and receiver of data, both configured by a set of low level rules at each side, and an encryption of communication, configured, for example, by a configuration file.

In 210, service 110 requests permission, from the middleware bus 130, to send to (i.e., write to) service 120. Alternatively, the permission request of 210 can be implicit in the sense that the service 110 merely invokes the service 115 via the middleware bus 130. In 215, the middleware bus 130 determines whether to grant service 110 permission to send to service 120 based on the low-level rules distributed by the policy node 105 in 205. Assuming the low-level rules distributed to the middleware bus 130 are those illustrated in Table 1 (above), and that the absence of permission to send is a lack of send permission, the middleware bus 130 determines to deny service 110 permission to access service 120 and sends a policy violation notification to the policy node 105.

The service 110 then requests permission, from the middleware bus 130, to send to service 115, 220. In 225, the middleware bus 130 determines whether to grant service 110 permission to access service 115 based on the low-level rules distributed by the policy node 105 in 205. Assuming the low-level rules distributed to the middleware bus 130 are those illustrated in Table 1 (above), the middleware bus 130 determines to grant service 110 permission to access service 120. Accordingly, in 230, the service 110 sends information to the service 115. If defined by the policy rules, this sending of information is logged.

In 235, the system administrator determines whether to update the low-level rules previously established in 200. Assuming the system administrator determines the low-level rules governing security policies between services requires updating, the system administrator operating the policy node 105 manually configures a new set of low-level rules, 240, and the policy node 105 distributes the new set of low-level rules to the middleware bus 130, 245 and all other concerned security functionality.

As will be appreciated, the manual configuration of low level rules between services or other receiver/sender entities in an IT system (e.g., based on an SOA framework) can be time-consuming and otherwise burdensome upon the system administrator. In addition, these manually defined rules have a very low level of assurance for correctness. For example, while only four (4) services were illustrated in FIGS. 1 and 2, it is typical for a high number of services to be deployed within actual SOA systems. The number of machine-enforceable rules governing access permissions and other parts of the security policy between the different services rapidly increases as the number of services increases, such that a manual configuration of machine-enforceable rules and configurations becomes increasingly problematic and/or impractical. In addition to the rules governing the business functionality of the system, it is also necessary to define rules controlling the infrastructure of the system, e.g. service deployment, directory services and so on. In agile systems it is also very difficult to maintain the rules, in order to keep the rules consistent with the evolution of the applications themselves. Also, non-SOA systems (e.g., data-centric systems or message oriented) suffer from similar problems in low-level enforcement of high level policies due to the tedious manual configuration of rules.

SUMMARY

An embodiment of the present invention is directed to a policy management system, including at least one policy management device that is configured to manage a policy input and/or a template and/or a functional model, the policy management device including a processor, memory having a computer executable program and the policy input and/or the template stored and/or the functional model therein, at least one policy enforced device that is directly or indirectly connected to the policy management device via a network and that is configured such that at least a part of the functional model managed by the policy management device reflects the functional features/behaviors of the at least one policy enforced device, at least one policy enforcement device that is configured to execute policy enforcement on the policy enforced device, the policy enforcement device being a part of or connected to the at least one policy enforced device and/or at least one policy decision device; and the at least one policy decision device that is configured to receive at least one machine-enforceable rule and/or configuration from the at least one policy management device. The at least one policy management device receives a policy input loaded from the memory, or entered by a user via a user interface, indicating at least one input policy for the at least one policy enforced device, the received input policy relating to non-functional system attributes for the at least one policy enforced device and received in a format that is not machine-enforceable at a policy implementation entity of the at least one policy enforced device. The at least one policy management device determines at least one functional model for the at least one policy enforced device relevant for the received input policy based on which functional system attributes are indicated by the input policy and/or configuration template, the at least one functional model indicating functional system attributes used to iteratively fill attribute placeholders. The at least one policy management device loads at least one pre-configured rule and/or configuration template from the memory to the processor. The at least one policy management device automatically or semi-automatically generates at least one machine-enforceable rule and/or configuration that is in a ready to implement format in a manner compliant with the received input policy by selecting the at least one pre-configured rule and/or configuration template corresponding to the input policy, and iteratively fills attribute placeholders of the at least one pre-configured rule and/or configuration template with functional system attributes values indicated by the at least one functional model, wherein the at least one machine-enforceable rule and/or configuration, which indicates at least one condition and at least one action is an output that is produced by the processor from the received policy input, the at least one functional model, and/or the at least one pre-configured rule and/or configuration template. The at least one policy management device transmits the at least one machine-enforceable rule and/or configuration to the at least one policy decision device that determines the result(s) of the at least one pre-configured rule and/or configuration template for the policy enforced device. The at least one policy enforcement device, when a policy relevant event occurs, instructs the at least one policy decision device to determine the result of the at least one condition of the transmitted at least one machine-enforceable rule and/or configuration for implementing the policy input for the at least one policy enforced device, thereby modifying an operation of the at least one policy enforced device or the at least one policy enforcement device to execute the at least one action.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
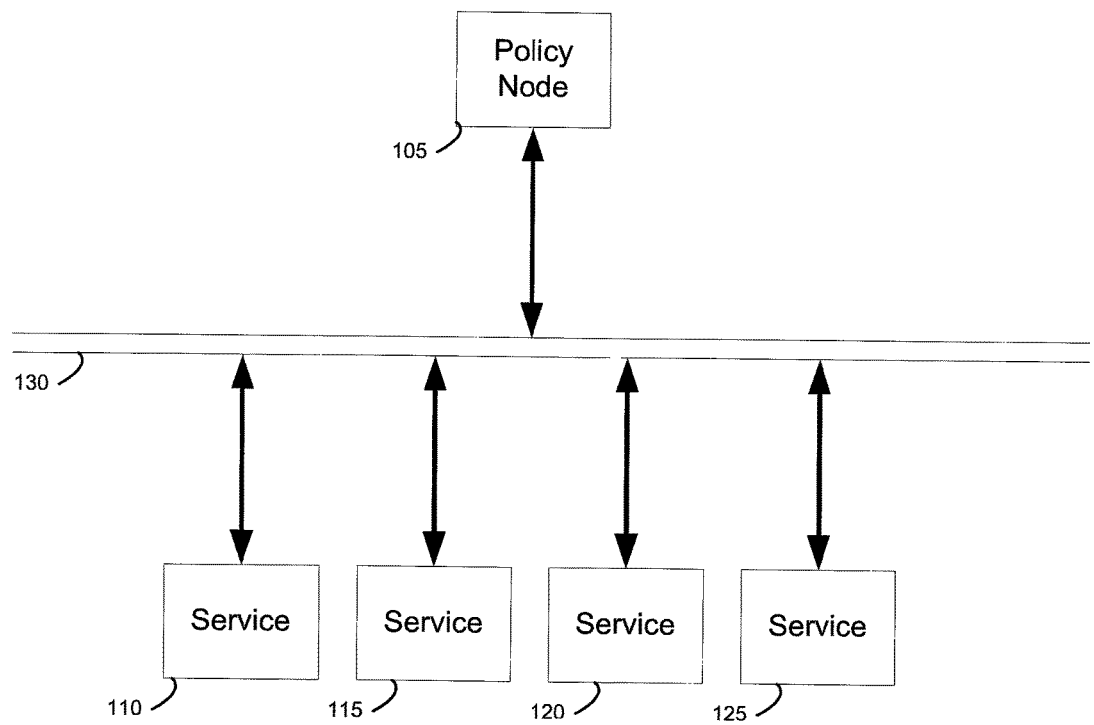
FIG. 1 illustrates a conceptual diagram of an Information Technology (IT) system.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Dynamic Generation of Low-Level Rules in an Information Technology (IT) System

As discussed in the Background section, system administrators conventionally enforce high-level policies (e.g., security policies, etc.) in an IT system (e.g., a Service Oriented Architecture (SOA) system, a data-centric system, etc.) by manually configuring low-level, machine-enforceable rules dictating security properties (and other non-functional system properties) like access permissions, Quality of Protection (crypto) or logging between services, between senders and receivers, to particular files, etc. If the number of manually configured security interfaces is relatively high, the manual configuration can be a time-consuming and error prone process. Accordingly, as will be described below in greater detail, embodiments of the present invention are directed to an automatic or dynamic generation of low-level, machine-enforceable rules based on a more generalized high level policy input from the system administrator (or another suitable stakeholder). This includes rules concerned with the interaction of the services, e.g. invocation of operations, information flows, sending and receiving of messages or transactions, and also rules concerned with the protection of the applications infrastructure, for example naming and trading services, service deployment or service management. Rules can be generated for various security mechanisms at different layers, e.g. middleware level access control collocated with the middleware stack or at a domain boundary controller, TCP level encryption, IP level encryption or IP level filtering.

In addition to policy enforcement, it is also possible to feed the rules into Intrusion Detection Systems (IDS), which then are able to detect deviations from the legitimate behavior of the system, as explicitly allowed by the policy.

Figure 3:
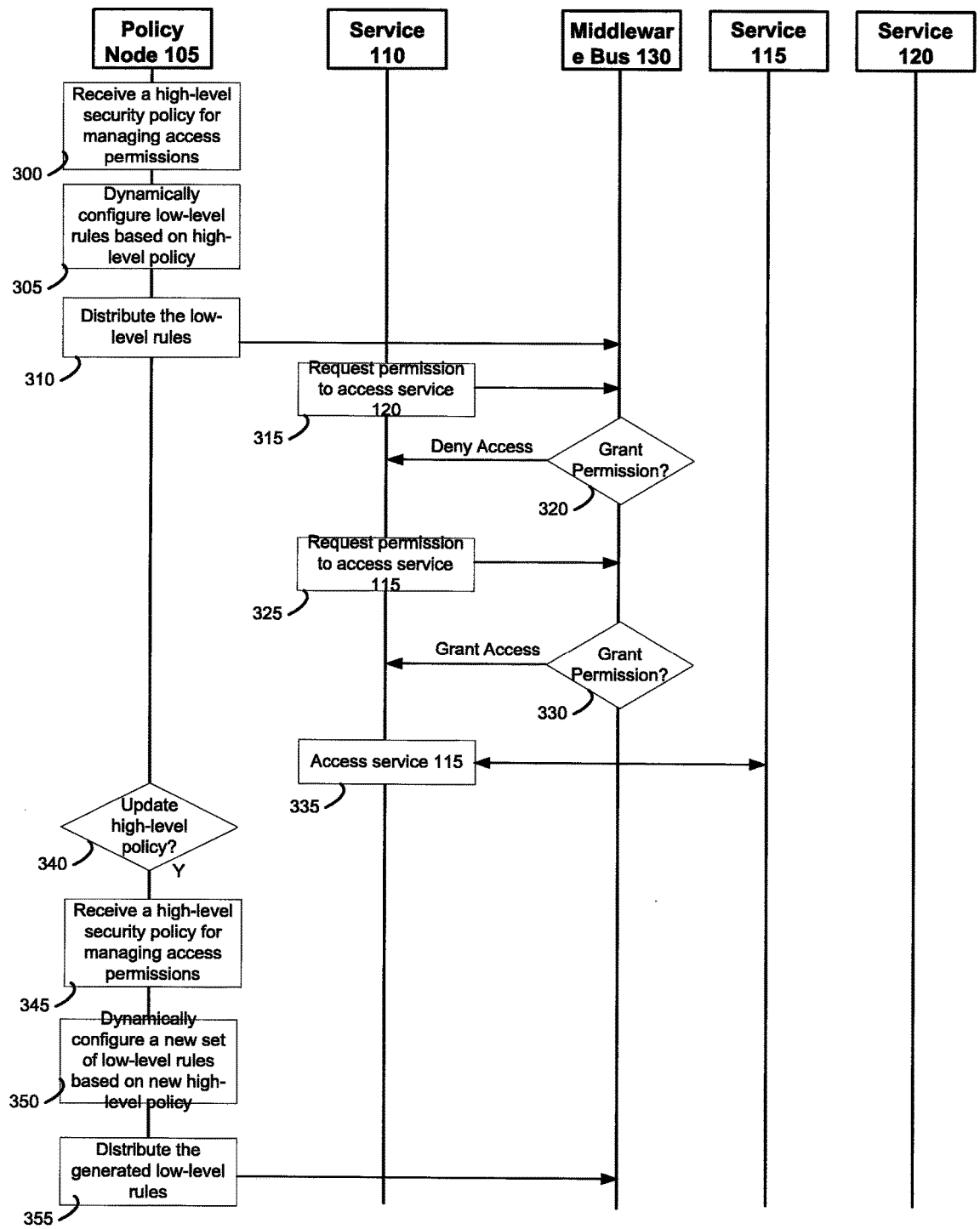
FIG. 3 illustrates a security policy process according to an embodiment of the present invention.

FIG. 3 illustrates a security policy process according to an embodiment of the present invention. For convenience of explanation, the process of FIG. 3 has been described below and illustrated as implemented within the IT system 100 of FIG. 1, which is illustrated as a SOA system. However, it will be appreciated that other embodiments of the present invention can be directed to any type of system architecture wherein network or system components/entities communicate with each other, or generate or process data. For example, as illustrated in FIG. 1, the security policies can be related to access between different services in an SOA system. In another example, the security policies can be related to access between any send component and a corresponding receive component, to the generation of data to be sent from a database and/or to control which received data is inserted to a database.

Referring to FIG. 3, in 300, a system administrator operating the policy node 105 inputs a high-level security policy to the policy node 105. In an example, the high-level security policy is, on a conceptual level, a "model" or at an M1 level, as will be described below in greater detail. In theory, anything that contains or embodies information can be interpreted as a model, for example security polices and rules, configuration, source code, functional models of applications or context information. Table 2 (below) illustrates a few examples of high-level security policies:

TABLE 2

| Example 1 (Medical scenario) | "All doctors can access all patient records" [DAC] |
| Example 2 (Medical scenario) | "Each doctor can only access patient records of their current patients" [DAC] |
| Example 3 (Security scenario) | "No personnel may access files having a higher security clearance than their own" [MAC] |

As will be appreciated from a review of Table 2 (above), the high-level security policy can be a security intent, or security goal, for the IT system 100. The high-level security policy is machine-readable, whereas low-level rules are both machine-readable and machine-enforceable. Thus, the high-level security policy, unlike the low-level rules, is not in a ready-to-execute format for the middleware bus 130. Rather, the high-level policy is in a more generalized format (e.g., at a higher abstraction level). As used herein, "machine-readable" means the high-level security policy is described in a sufficiently formalized, semantically clear form with a clearly defined meaning (e.g., using meta-modeling and meta-meta-modeling) capable of being transformed (e.g., via a model transformation), to generate low-level machine-enforceable rules at a lower, detailed, technical abstraction level that a machine (e.g. a security policy decision point software) can use to make decisions, as will be discussed below in greater detail (e.g., see steps 610B/615B of FIG. 6B).

Depending on the implementation, in some embodiments of the invention "rule and configuration" templates may be utilized. Rule and configuration (RC) templates are at the abstraction level of the low level rules and configuration, but are not directly enforceable by an enforcement entity. Rule and configuration (RC) templates may contain abstract notations of principals (e.g. sender/receiver, client/server). For example, RC templates can be included in COTS software packages or policy nodes, e.g. component assemblies. During installation or deployment, RC templates may be mapped to the concrete security information of the installed system. The resulting rules and configuration can then be directly enforced. The mapping process can be done for example using a simple text replacement or by using model transformations.

After receiving the high-level security policy, in 305, the policy node 105 dynamically configures a plurality of low-level rules governing access permissions and/or configuration for other security functionality like encryption or logging between services 110, 115, 120 and 125. As discussed in the Background section, a low-level rule is a machine-enforceable rule with sufficient specificity to be applied by the middleware bus 130 (e.g., "service 110 can access services 115 and 120, but not service 125", etc.) or other enforcement entity. Alternatively, while not shown in the example of FIG. 3, the low-level rules can be enforced by the services themselves, at an application layer, at a network layer, via a VPN or firewall, etc. Accordingly, while a middleware-enforced rule structure has been described with respect to FIG. 3, it will be appreciated that other embodiments of the present invention can be directed to different network elements enforcing the low-level rules. The dynamic configuration of low-level rules by the policy node 105 is described in greater detail below with respect to FIGS. 4A through 6B.

Figure 2:
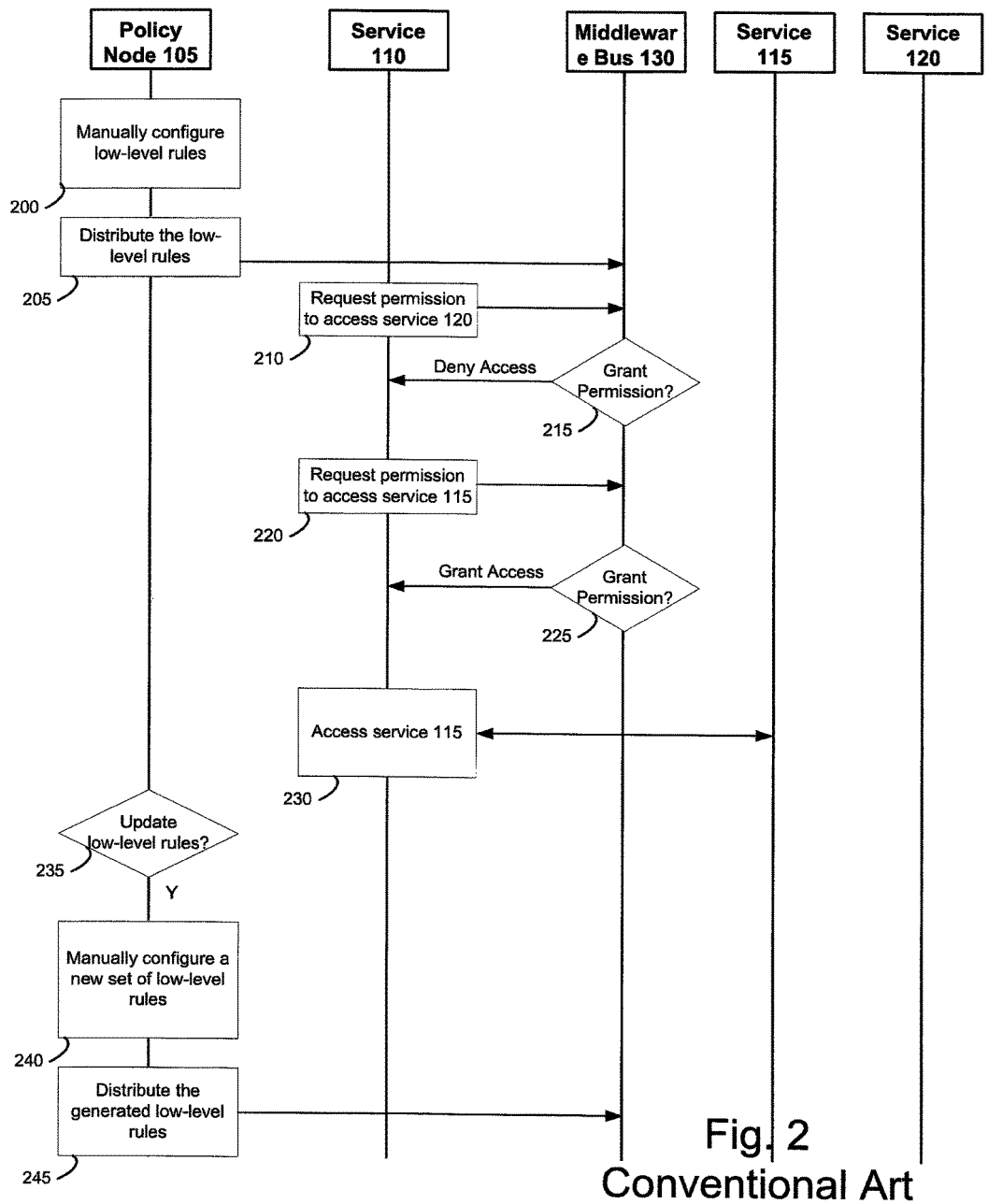
FIG. 2 illustrates a conventional access permissions process implemented within the IT system of FIG. 1.

Next, steps 310, 315, 320, 325, 330 and 335 of FIG. 3 correspond to steps 205, 210, 215, 220, 225 and 230, respectively, of FIG. 2. As such, a further description of steps 310-335 has been omitted for the sake of brevity.

Referring to FIG. 3, at 340, the system administrator determines whether to update the high-level security policy previously inputted in 300. Assuming the system administrator determines the high-level security policy requires updating, the system administrator operating the policy node 105 selects and inputs a new high-level security policy, 345, the policy node 105 dynamically configures a new set of low-level rules based on the new high-level security policy, 350, and the policy node 105 distributes the new set of low-level rules to the middleware bus 130, 355. In addition, if the system is modified, e.g. a service is added, the low level rules for the modified system portion are generated and distributed as well (normally without the need for changes to the high-level security policy). In an example embodiment of the invention, protection rules for infrastructure systems (e.g. naming services, registries, repositories) can be automatically generated using "infrastructure templates", which can be pre-defined for each particular type of IT system.

While not illustrated explicitly within FIG. 3, the enforcement entity (e.g., the middleware bus 130) may be configured to monitor the permitted or denied accesses of different services or send/receive components and to send this logging information to a central logging node (e.g., the policy node 105 or other network entity (not shown)). The events, for example notifications of policy violations or usage statistics, can be displayed inside a graphical representation of the functional model of the application.

As will be appreciated by one of ordinary skill in the art, the process of FIG. 3 differs from the conventional process of FIG. 2 at least in that the system administrator need only input a high-level security policy, or security intent, including a small number of high level, business and compliance oriented, abstract rules, instead of manually configuring a large number of mechanism and platform specific low-level rules, which are machine-enforceable, for the middleware bus 130 to implement (e.g., alternatively, the services or sender/receiver components themselves can be configured to enforce the low-level rules). Conventionally, IT systems are not capable of automatically or dynamically transforming a system administrator's security intent or goal into implementable rules that can accurately enforce that policy within a given IT system having a given system infrastructure. Embodiments of the present invention are directed to modeling methodologies by which the policy node 105 can perform this transformation and generation.

Discussion of Modeling Concepts

For clarity, a description of terms and concepts to be used below with respect to modeling techniques will now be provided. One embodiment of the invention uses these modeling concepts to enable the wide applicability of embodiments of the invention, allows for customization/flexibility, and aids the well-defined use of functional models in embodiments of the invention. In particular, the terms "model", "meta-model", and "meta-meta model" will be discussed. While modeling layers are discussed below as if to include clear demarcations, it is often difficult to distinguish between different modeling layers and to parse which portion in an actual implementation corresponds to which model layer. Thus, the clearly defined layers below should be considered merely one example of potential modeling layer demarcations to help explain the implementation examples that are provided below in this application.

Further, it is important to distinguish between modeling layers and abstraction layers (e.g., because modeling layers and abstraction layers may be orthogonal to each other). In modeling, entities of a modeling layer are expressed in the terms of the next higher layer, For example, a policy is expressed using a meta policy or policy model. This is independent of the policy abstraction level itself, e.g. the high level security policy is expressed using a high level security policy model (with its associated meta-model and meta-meta model), while a low level policy, e.g. access control rules, firewall IP filter rules are expressed using their own models. Abstraction layers are layered, ranging from the high layers (e.g., more abstract, conceptual, simplified, business-driven, human-centric) to the low layers (e.g., more concrete, machine-enforceable, technology-instance-specific). In the described modeling approach, abstraction layers are connected by model transformations, which transform the information from one abstraction layer into the information on another abstraction layer. For example, in the OMG Model Driven Architecture (MDA), a "refinement process" transforms models from higher abstraction layers into models on lower abstraction layers (more specifically, a so-called platform independent model (PIM) into a so-called platform specific model (PSM), which in turn is transformed into a so-called implementation and deployment).

A model (e.g., the high-level security policy inputted by the system administrator in 300/345 of FIG. 3, with examples given above in Table 2) is at a first level of abstraction above the items of interest (e.g., the low-level rules as established in 305/350 of FIG. 3) to the modeler (e.g., the system administrator) and describes a specific, relevant aspect of the overall system. Hereinafter, the "model" layer is referred to as at the M1 level or layer, and the items of interest of the M1 are referred to as the M0 level or layer. Again, a low level policy is not an instance of a high level policy; rather, both are instances of their own meta models.

A meta-model, sometimes also called "Domain Specific Language" (DSL), is at a second level of abstraction for the modeler. The items of interest at the meta-model level are the modeling constructs which are used to describe the entities (e.g., objects and associated object properties) of the model. In other words, the meta-model models the model. The meta-model layer is referred to as the M2 level or layer. Modelers can use different meta-models for different types of models. For example, the constructs/rules used to model process flows are different than the constructs/rules used to model data structures. An example of a meta-model includes the Unified Modeling Language (UML) or the OpenPMF policy model.

A meta-meta-model is at a third level of abstraction for the modeler. The constructs used to describe the meta-model (M2) can be referred to as being at the meta-meta-level, which is referred to as the M3 level or layer. Examples of meta-meta models are Ecore and the Meta-Object Facility (MOF). MOF is an Object Management Group (OMG) standard for model-driven engineering, and is typically used to define the Unified Modeling Language (UML). The M2 MOF model is the UML meta-model. The OMG has defined two variants of MOF; namely, Essential MOF (EMOF) and Complete MOF (CMOF). ECore, which is defined in the Eclipse Modeling Framework (EMF), is substantially aligned on OMG's EMOF.

As an example, reference will now be made to Example 2 from Table 2. Example 2, which is a high-level security policy, states "All doctors can access all patient records". The M2 layer describes how to define a security policy in general, the attributes of the entities, their relationships and how to derive a decision based on the security policy, attributes and relationships. The M2 layer is expressed using a M3 meta-meta model. The abstract high-level security policy is at the M1 layer. It is similar to an UML class definition and describes an abstract policy for an application. The M0 is a concrete, but still high level policy, for the deployed system. In contrast to the M1 policy, M0 contains concrete instances of attributes.

It is not in all cases necessary that models at all layers exist. For example, the high level M0 policy is defined as a high level policy instance for a concrete deployment. Since the high level M0 policy is not directly enforceable, it might not need to be included, because the low level, machine-enforceable rules may be capable of being generated from the high level M1 policy.

The low-level rules, or rule instances, dynamically generated based on the high-level security policy, have similar layers as well. Here, the M0 layer describes the enforceable rules and configurations for a concrete deployment.

The system administrator that enters the high-level security policy is thereby aware of the objects and associated object properties defined by a meta-model to be applied to the high-level security policy. Thus, the system administrator configures the high-level security policy to trigger an appropriate generation of rules (e.g., based on which rule templates are invoked during the rule generation), as will be discussed below in greater detail. The M3 layer constructs, which are used to define the M2 level terms, are typically built into the modeling tool (e.g., ECore). The security model is typically defined by the supplier of the generation tools.

Modeling Architecture According to an Embodiment of the Present Invention

Figure 4A:
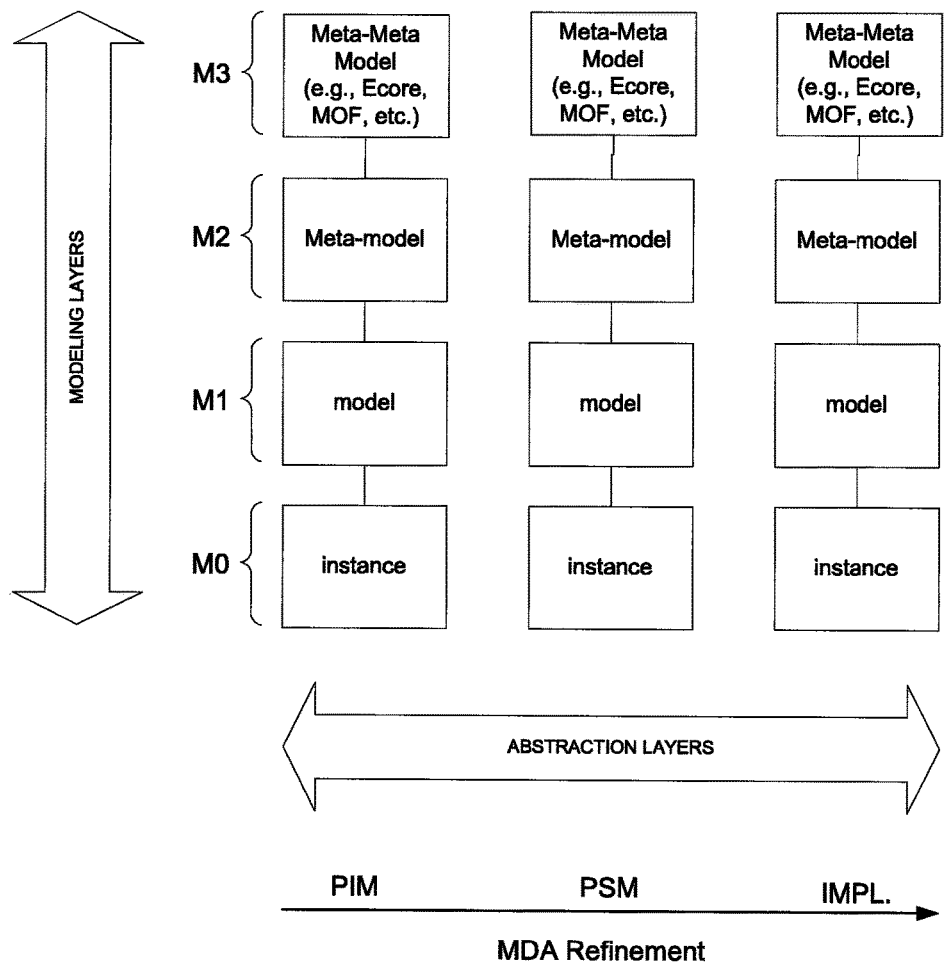
FIG. 4A illustrates an example of a modeling and abstraction framework according to an embodiment of the present invention.

FIG. 4A illustrates an example of a modeling and abstraction framework according to an embodiment of the present invention. FIG. 4A does not illustrate the exclusive way in which modeling layers and abstraction layers can be considered on a conceptual layer, but rather an example provided to aid in the understanding of example implementations described below in greater detail.

Accordingly, referring to FIG. 4A, each vertical column corresponds to an abstraction layer (e.g., a functional layer, an event layer, a security layer, a rule layer, etc.), and each horizontal column corresponds to a modeling layer. As will be appreciated, with respect to the modeling layer, lower positioned boxes correspond to more concrete, or less abstract, modeling layers. Thus, an instance layer is placed below a model layer, the model layer is placed below a meta-model layer, and the meta-model layer is placed below a meta-meta model layer. Each abstraction layer is illustrated in FIG. 4A as having the same modeling layers as other abstraction layers, although this is not necessarily the case. The model layers are typically orthogonal to the modeling layers: each column shows a model (and can also include an instance, depending on the particular MDA implementation), together with its meta model and meta-meta model. The left column shows the abovementioned MDA PIM layer, which during the MDA refinement process gets transformed into the intermediate MDA PSM layer (middle column), which in turn during the MDA refinement process gets transformed into the implementation (right column). The traditional purpose of the OMG MDA is to transform abstract software models (left column) into concrete software applications, systems or configurations (right column via medium column as an intermediate step)

Figure 4B:
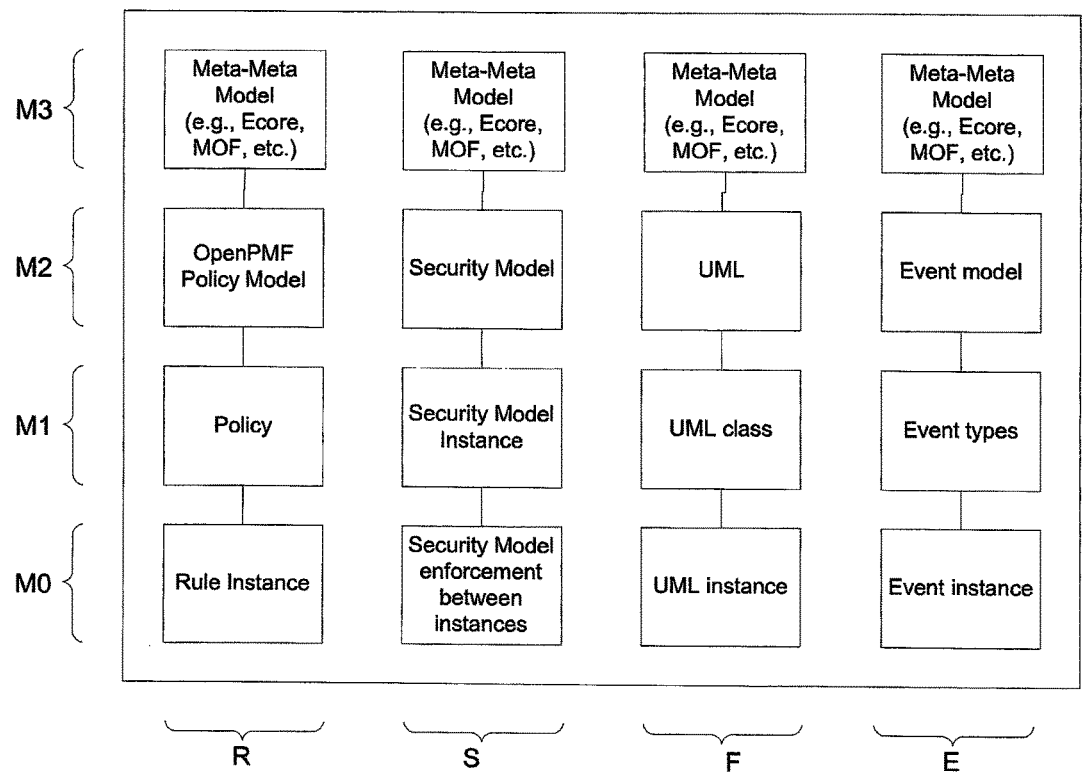
FIG. 4B illustrates a Model Driven Security (MDS) matrix according to an embodiment of the present invention.

FIG. 4B illustrates a Model Driven Security (MDS) matrix according to an embodiment of the present invention. In particular, the MDS matrix is one example conceptual modeling configuration that can be established based on the modeling and abstraction framework defined by FIG. 4A. The MDS matrix of FIG. 4B is a framework for interpreting the M0, M1, M2 and M3 modeling layers (i.e., model driven architecture (MDA) layers). The matrix shows some of the models that can be involved in embodiments of the invention, and how they relate to the modeling layers. It is not necessary that all elements of the matrix are present, e.g. in some embodiments of the invention, or parts of particular implementations, some elements might not exist. For example, if the low level rules are generated in form of textual configurations, e.g. a filter table for an IP Packet Filter, a formal meta model is normally missing. Also, policies and rules might be described in three modeling layers, a meta meta model, a meta model (Domain Specific Language), and then directly the policies and rules. Items within each column relate to each other in that each item is expressed using the constructs of the item above in the same column. In an embodiment of the invention, all models can have a common meta-meta model (M3). The layers and columns in FIG. 4B are examples for a particular embodiment of the invention, other categorizations are also possible. With respect to FIG. 4B, the different columns (i.e., R, S, F and E) of the MDS matrix will now be described in more detail. The rows M0 through M3 correspond to the MDA layers discussed above, and the columns R, S are described correspond to different security policy abstraction layers. Column F describes an example of functional models of the applications, and Column E describes an example of event types (for example used for feeding security events from local enforcement back to the policy node 105). Further, the denotation "R2" refers to the intersection of column R and row M2, the denotation "F3" refers to the intersection of column F and row M3, and so on. Row M3 is common throughout each of columns R, S, F and E, and corresponds to the meta-meta layer (e.g., ECore, MOF, etc.), and is not described with respect to any particular column below.

Column R of FIG. 4B is a policy rule and configuration column or abstraction layer. With respect to column R of FIG. 4B, R2 is an OpenPMF policy model (i.e., a meta-model) and is an instantiation of ECore M3 that captures the logical structure of the OpenPMF Policy Definition Language (PDL). In an example, R2 can be considered a Domain Specific Language (DSL) for platform independent access control, logging and Quality of Protection rules. R1 is for example, generated from the high-level models (security intent, functional models and other models) described above with respect to 305/345 of FIG. 3. R1 is effectively a representation of a collection of security rules and configurations in a model. R1 captures the information sent to the OpenPMF runtime for security enforcement and violation detection.

Column S of FIG. 4B is a high level policy intent column. With respect to column S, a security model S2 is an instantiation of ECore M3 or MOF M3 that captures the elements of which security models S1 can be built. Security model instance S1 is the particular security model intended. Examples include Role-Based Access Control (RBAC), Mandatory Access Control (MAC), Discretionary Access Control (DAC), Chinese Wall or other specific security models (e.g. governance policies, regulatory compliance policies, best practice policies, privacy policies, custom-developed policies). Security model enforcement S0 describes the actual implementation of the security model within the policy R0. As an example, security models S2 can be transformed into concrete rules R0.

Column F of FIG. 4B is a functional column. Functional models provide useful input into MDS, as described in greater detail below. Functional models may for example be specified by software engineers (e.g., as UML) or SOA architects (e.g., as business process modeling notation (BPMN)) as part of the software engineering or SOA deployment process. UML model F2 describes UML constructs such as the concept of a UML Class, UML Class model F1 describes the concrete UML model (e.g., a class diagram), and UML instance F0 is a specific class (e.g., a particular user).

Referring to Column F, the functional model F0-F3 describes a given IT system and includes information that is useful from a security standpoint. For example, the functional model F0-F3 can include (i) date and information formats, (ii) a list of services and components of the system, (iii) interactions between different services and components (e.g., potential communication paths between components, such as which components can send information to which other components, etc.), (iv) business processes and (v) deployments, to name but a few.

Functional models are well-known in the art and are commonly defined and used by system or software architects in designing distributed software among other implementations. However, functional models have not conventionally been used in a security framework to automate the generation of machine-enforceable rules from flexible, high level security intent, for example compliance rules. Thus, as will be described in greater detail below, an embodiment of the present invention is directed to taking advantage of pre-defined functional models and using them in a security framework for the automatic generation of machine-enforceable rules.

Column E of FIG. 4B is an event column. In OpenPMF 2.0 MDS, events and their interpretation convey policy violations back to a central policy manager (e.g., the policy node 105). The Event meta-model E2 captures the constructs events can be made of, E1 is used particular types of events (e.g. un-authorized access attempts, access granted, etc.), and E0 represents an actual event instance. For example, assume a message arrives at some node and an evaluator program checks whether the message should be allowed. If there is no matching rule that permits the message, the evaluator program determines the message to be an attempted attack. The central manager would then be notified of the attempted attack, and can display a notification to an operator or can simply log the attempted attack.

Figure 5A:
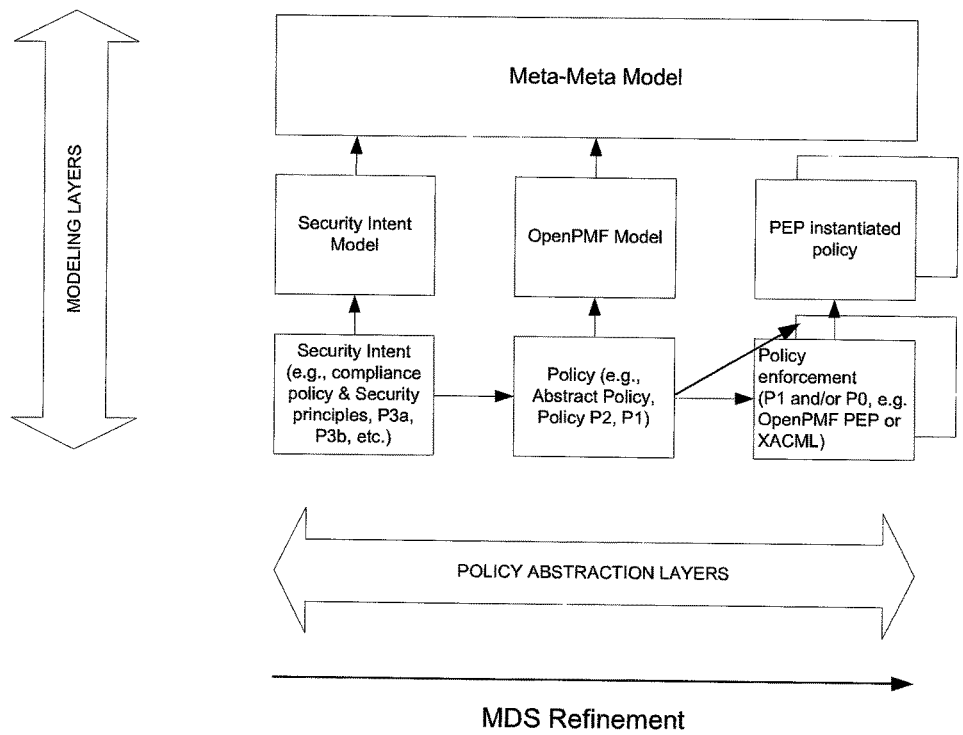
FIG. 5A illustrates modeling and abstraction layers according to an embodiment of the present invention.

FIG. 5A illustrates modeling layers and abstraction layers and the MDS transformation (refinement) process, according to an embodiment of the present invention. The matrix is somewhat related to FIG. 4 but simplified (the distinct model and meta-model rows in FIG. 4A are combined in FIG. 5A). Referring to FIG. 5A, each column shows an abstraction layer, with the most abstract layer on the left and the most concrete layer on the right. Each row shows a modeling layer, where each item in each column is expressed using its meta-model from the item in the row that is next above (illustrated using upward-facing arrows). The meta-meta layer in the first row is common to all abstraction layers.

In addition to the modeling layers (rows), FIG. 5A shows transformation relations between the different abstraction layers (columns), illustrated using horizontal left-to-right arrows according to an embodiment of the invention. High-level security policy models can include, for example, governance/regulatory compliance security intent, illustrated in FIG. 5A as P3a, and/or security principles, such as, for example MAC, DAC, Chinese Wall, illustrated in FIG. 5A as P3b. Such high-level security policy models are transformed into an abstract policy (P2) (i.e. sets of technology or infrastructure-neutral rules) using pre-built templates and subsequently transformed into a (concrete) policy (P1) (i.e. sets of technology-specific rules). The P1 and P2 policy layers are illustrated in the same conceptual box in FIG. 5A. In an example, after a P1 policy is generated, the P1 policy can be distributed to enable enforcement (P0), to the enforcement entity, for example OpenPMF enforcement points or XACML enforcement points collocated with the middleware, or a separate, central Policy Decision Point. Note that the purpose of FIG. 5A is to convey the general concept rather than a specific specification of a system. The types of configurations illustrated in FIG. 5A are not normally described by full modeling concepts, and rather are typically implemented via a transformation to text (M2T).

The templates for the transformation from high level policies to low level rules and configurations can be implemented in various ways in different embodiments of the invention. It is, for example, possible to select specific transformations implementing specific, hard coded security models, or to define the mapping process in a model, a domain specific language describing the mapping process, and use a generic transformation.

Figure 5B:
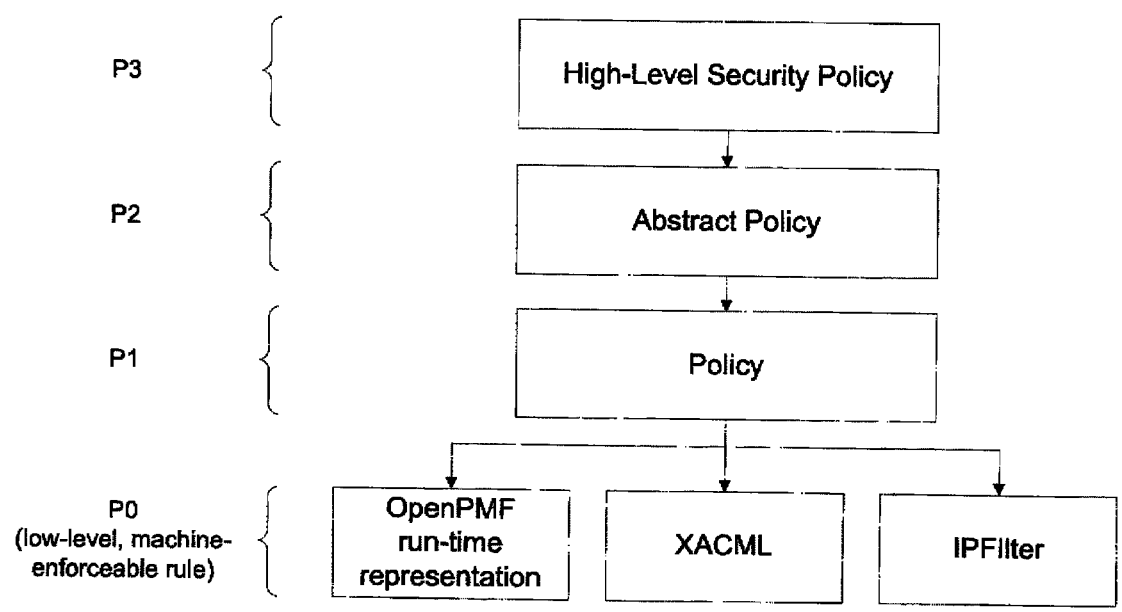
FIG. 5B illustrates a plurality of policy layers according to an embodiment of the present invention.

FIG. 5B illustrates a plurality of policy "layers" that are associated with R1 of FIG. 4B. Referring to FIG. 5B, P3 indicates one or more high-level security policies (which could be referred to as P3a, P3b, P3c, . . . ,). For example, P3 can indicate a "compliance policy" or compliance models, which are abstract types of enterprise policies. For example, a Sarbanes Oxley (SOX) compliance policy could be "all significant information has to be protected", and a Health Insurance Portability and Accountability Act (HIPAA) compliance policy could be "every doctor is allowed to access the health record of the patient they are treating", HL7, COBIT, privacy legislation, TOGAF/DoDAF, MODAF etc. Thus, the P3 policy layer can, in an example, include government regulations.

Alternatively, P3 can include security models having security model semantics. For example, security model semantics may include "MAC controls all information flow", "no personnel below top-secret may access top-secret files", etc. The high-level security policy from which the low-level rules are generated can, in an example, include both a security model and a compliance policy. In this case, the different P3 portions can be denoted as P3a, P3b, etc. for each compliance policy and/or security model. Thus, it is possible that high-level security policy could qualify as both a government regulation under and a security principle under P3 (e.g., if the government regulation relates sufficiently and directly enough to security).

Alternatively, P3 can include security policy models that are for example organization-specific, industry-specific, market-specific, user-specific, technology architecture specific, enterprise architecture specific, and business architecture specific. For example, P3 could state high-level security policies for an airport in terms of passengers, bags, and boarding passes.

The abstract policy P2 corresponds to the same security intent as P3, except P2 relates this information at a lower abstraction layer (closer to machine-enforceable, except security attributes are expressed in a technology-independent way) in a security infrastructure independent form, such as a Platform Independent Model (PIM) (e.g., in PDL: (client==###A)&(target==###B), etc.)). In general, it can be said that P3 concentrates on a description of security objectives (e.g. confidentiality, integrity, auditability, availability), while P2 is an abstract description how to protect the system, which controls to apply where (e.g. encryption, access control, logging). The Policy P1 corresponds to security intent at a level of abstraction (similar to a Platform Specific Model (PSM)) that can be enforced directly on the technical infrastructure (including infrastructure specific information such as technology-specific identities), e.g. in PDL: (client==DN_A)&(target==DN_B)& . . . )). In other words, the P1 rules and configurations are distributed to the enforcement entity (e.g., the middleware layer access control, middleware layer policy enforcement, crypto mechanisms, network layer filtering) for enforcement. P0 is used to describe the policy runtime representation in the format of the enforcement infrastructure (e.g., the particular pointer structure of a rule enforcement instantiation). The OpenPMF runtime has its own runtime representation, but the policy P1 can also be mapped down to, for example, eXtensible Access Control Markup Language (XACML), IPFilter etc. for enforcement outside OpenPMF or even command line options to configure encryption at the application startup.

Typically, the lower the layer and abstraction level of the policy, the higher the number of rules. A P3 policy might state that for all information exchange the BellLaPadula Multi Level Security model has to be used. This is a single rule. At the lower layers, this rule is expanded to a large number of lower level rules configuring the MLS properties at all relevant Policy Enforcement Points and also configuring the crypto system.

Figure 6A:
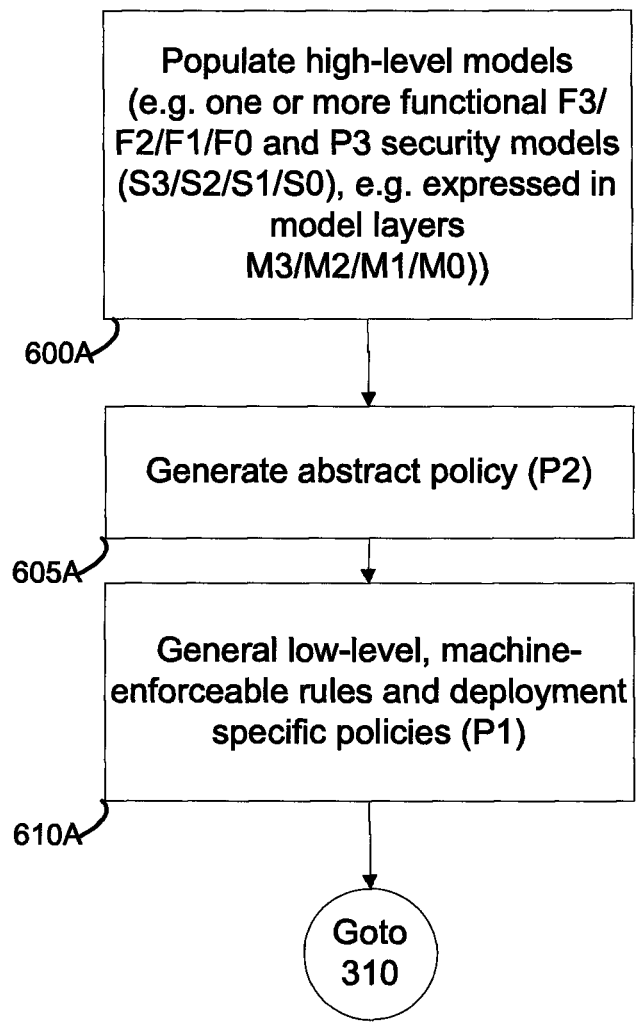
FIG. 6A illustrates a process for transforming high-level policies into machine-enforceable rules according to an embodiment of the present invention.

Examples of Transforming a High-Level Policy into Machine-Enforceable Rules Based on Modeling Methodologies FIG. 6A illustrates a more detailed version of steps 305/345 of FIG. 3 according to an embodiment of the present invention. In particular, FIG. 6A illustrates a MDS based approach for transforming high-level security policies into machine-enforceable rules and configurations. Below, FIG. 6A is described in a broad, generalized fashion that can be applied to many different types of systems, meta-meta model types, meta-model types, model types and/or policies, followed by a number of examples that describe how the modeling and abstraction layers can be utilized during an automatic or dynamic rule generation process in more detail.

Below, FIG. 6A is described with reference to the particular modeling layers defined above with respect to FIGS. 3 through 5. However, as discussed above, it is understood that the example modeling concepts described in FIGS. 3 through 5 illustrated non-limiting examples of embodiments of the present invention, and that modeling and abstraction layers can be defined in different ways in alternative embodiments of the present invention. Further, in the description of FIG. 6A below, it may be assumed that the meta-meta modeling M3 layer is ECore, and the M2 layer is OpenPMF. However, it will be appreciated that other embodiments of the present invention are not limited to these assumptions.

Referring to FIG. 6A, in 600A, the policy node 105 populates high-level models for rule generation. This includes populating functional models (F3-F0) (e.g., from Column F of FIG. 4B), non-functional models (e.g., a security model or intent such as from Column S of FIG. 4B, selecting appropriate M3 and M2 layers, etc.) and rule templates. As will be appreciated, step 600A can be performed in advance of any actual rule generation process invoked by the system administrator. Thus, the functional models can be programmed by a system architect prior to an initiation of a rule generation process, and the rule templates can likewise be generated before the rule generation process is invoked, for example.

Next, at 605A, the policy node 105 generates an abstract or infrastructure-neutral policy or model. At this point, the policy node 105 reads in the pre-configured rule templates that are generated in 600A. In 605A, the policy node iterates through relevant elements of the functional model that is populated in 600A (e.g., identifying senders/receivers for a particular IT system, etc. . . . ) to determine a set of components, or system infrastructure attributes, that will be used in the low-level rules. The policy node 605A also checks a security intent, or high-level security policy, in order to generate the abstract or infrastructure-neutral model or policy. Finally, in 610A, the policy node 105 generates a plurality of low-level, machine-enforceable rules (and deployment-specific policies) based on the abstract policy generated in 605A.

Figure 6B:
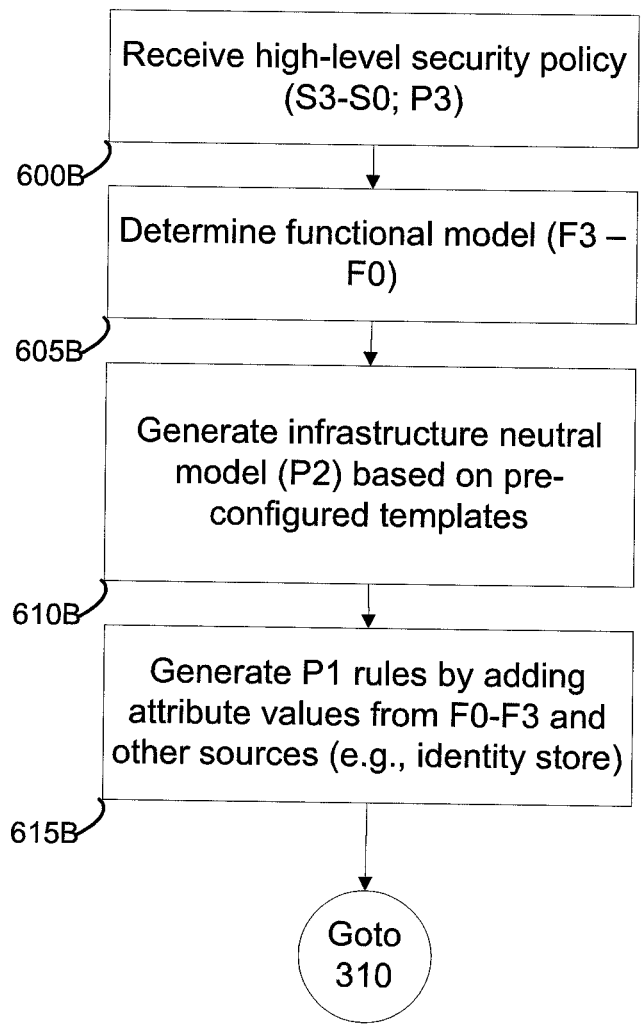
FIG. 6B illustrates another process for transforming high-level policies into machine-enforceable rules according to an embodiment of the present invention.

Above, FIG. 6A is discussed in a relatively broad fashion. FIG. 6B, below, illustrates an example implementation of the process of FIG. 6B. In part to show the flexibility of the process of FIG. 6A, FIG. 6B illustrates the functional model determination occurring subsequent to the receipt of the high-level security policy. Of course, it will be appreciated that the functional model can alternatively be pre-loaded or predetermined.

Therefore, for the sake of convenience, FIG. 6B and the subsequent examples focus on P3 through P0 as illustrated in FIG. 5B, M1, M0 and F3 through F0 as illustrated in FIG. 4B. Also, for convenience of explanation, the example embodiment of FIG. 6B is described below as performed within the IT system 100 of FIG. 1, although it will be appreciated that other example embodiments of the present invention can be directed to an implementation in any IT system.

Referring to FIG. 6B, in step 600B, the policy node 105 receives a high-level security policy. As used herein, a "high-level security policy" is a description of a security goal for an IT system that is in a non-machine-enforceable security format with a high level of abstraction. However, the high-level security policy is in a machine-readable format. In other words, as discussed above, one or more objects (e.g., words) in the high-level security policy are pre-configured meta model M2 layer objects. Thus, a system administrator that enters the high-level security policy enters the high-level security policy in a pre-negotiated or agreed-upon format to ensure that the high-level security policy is interpreted correctly.

Further, from a conceptual standpoint, referring to FIG. 5B, the high-level security policy received at step 600B of FIG. 6B is at the P3 (e.g., MAC/DAC or any other security intent). It is not necessary that the whole security intent is described by a single model P3; rather, the security intent can be described at multiple models at the P3 layer (e.g., P3a, P3b, . . . P3n), as described above with respect to FIG. 5B.

Next, in step 605B of FIG. 6B, the policy node 105 determines a functional model (F0-F3) for the IT system. As discussed above, the functional model described the IT system 100 in detail. In an example, the functional model determined in step 605B can simply be retrieved or loaded from memory if the functional model has been pre-configured or pre-defined by a system or software architect of the IT system (e.g., in step 600A of FIG. 6A). As mentioned above, it is common for software architects to define functional models for IT systems for facilitating non-security features or programs. However, embodiments of the present invention can be directed to utilizing the functional model in a security setting, thereby sparing additional labor on the part of a system administrator operating the policy node 105 to apply security rules. Alternatively, however, if the functional model is not available for the IT system 100, the policy node 105 can generate its own functional model for the IT system 100 as is known in the art.

Referring to FIG. 6B, in step 610B, the policy node 105 generates an infrastructure-neutral security model for the received high-level security based on (i) the functional model determined in step 605B and (ii) pre-configured security templates. The infrastructure-neutral security model includes one or more templates that are not specific or tailored to a particular IT infrastructure. In an example, the pre-configured security templates can be loaded by a system administrator at the policy node 105. The pre-configured security templates can, in an example, have a format as illustrated in Table 3 (below) for a discretionary access control (DAC) system:

TABLE 3

| For permitting access | (client.name == <client.name>)&(target.name == <target.name>)&(operation.name == send): allow; |
|---|---|
| For denying access | (client.name == <client.name>)&(target.name == <target.name>)&(operation.name == send): deny; |

In another example, the pre-configured security templates may have a format as illustrated in Table 4 (below) for a mandatory access control (MAC) system:

TABLE 4

| For permitting access | (client.clearance <= target.clearance)&(operation.name == send): allow; |
|---|---|
| For denying access | (client.clearance <= target.clearance)&(operation.name == send): deny; |

Thus, referring to Tables 3 and 4 (above), it will be appreciated that the pre-configured templates are not infrastructure specific because the templates include variables (e.g., "client.clearance", "client.name", etc.) that can be filled in to conform to different IT infrastructures. Further, while the operation in Tables 3 and 4 is defined as "send", it will be appreciated that other templates can be directed to other operations, such as "receive", "read", "write", etc, depending on the application's functional model. In the example, the operation name is hard coded in the template, since an information flow is described. In other embodiments of the invention, the operation name might be defined as template <operation.name> as well. In this case, the operation name would be substituted with the corresponding information from the functional model. Similarly, templates can include other actions in addition to "allow" and "deny", for example "log", "alarm" and "operation name".

Next, in step 615B, the policy node 105 generates a plurality of infrastructure-specific ("machine-enforceable") rules (P1) via an automated, iterative process. In particular, the policy node 615B fills the pre-configured templates with attributes (e.g., a particular client's identity for the variable "client.name", etc.) to conform to the high-level security policy. For example, in a DAC system, if the high-level security policy is to grant all entities full access to all other entities, the iterative process of step 615B can set the template to permit access (e.g., see Table 3 (above)) for each possible target/client combination. Step 615B is described in greater detail below with respect to a number of illustrative examples.

In an alternative example, steps 610B and 615B can be "combined" such that the P1 rules of step 615B are generated directly, without first populating the set of P2 rules from step 610B. Thus, while steps 610B and 615B are illustrated as separate steps, it will be appreciated that these steps can be performed concurrently in at least one embodiment of the invention.

After the plurality of machine-enforceable P1 rules are generated in step 615B, the plurality of machine-enforceable P1 rules can be consolidated within a security rule repository (RR) (e.g., the security RR may be a file or database) and the process advances to step 310 of FIG. 3, where the rules (e.g., via the security RR) are distributed to an enforcement entity (e.g., the middleware bus 130). While not illustrated in FIG. 6B, it will be appreciated that the enforcement entity can transform the P1 rules into a P0 rule instance during actual enforcement of the rules. In other words, the actual run-time instantiation of a particular rule need not be distributed to the enforcement entity. The enforcement entity can for example be structured as one or more centralized policy decision points which are queried by enforcement points, and as one or many decentralized combined policy decision/enforcement points.

Further, while not illustrated explicitly within FIG. 6B, it will be appreciated that one or more supplemental rules can be automatically generated during the generation of the rules at step 615B. For example, if a sender S is permitted to send information to a receiver R based on a rule generated at step 615B, it will be appreciated that the sender S may require an address or other identifier of the sender S to facilitate the permissible communication. Thus, in an example, an additional rule (or rules) could be generated to grant the sender S permission to access a call/find receiver (e.g., a components server, firewalls, naming services and a discovery server) from which an address of the receiver R could be queried. In an example, these supplemental rules, in an example, can be pre-defined such that their inclusion with the plurality of rules generated in step 615B is automatic.

Figure 6C:
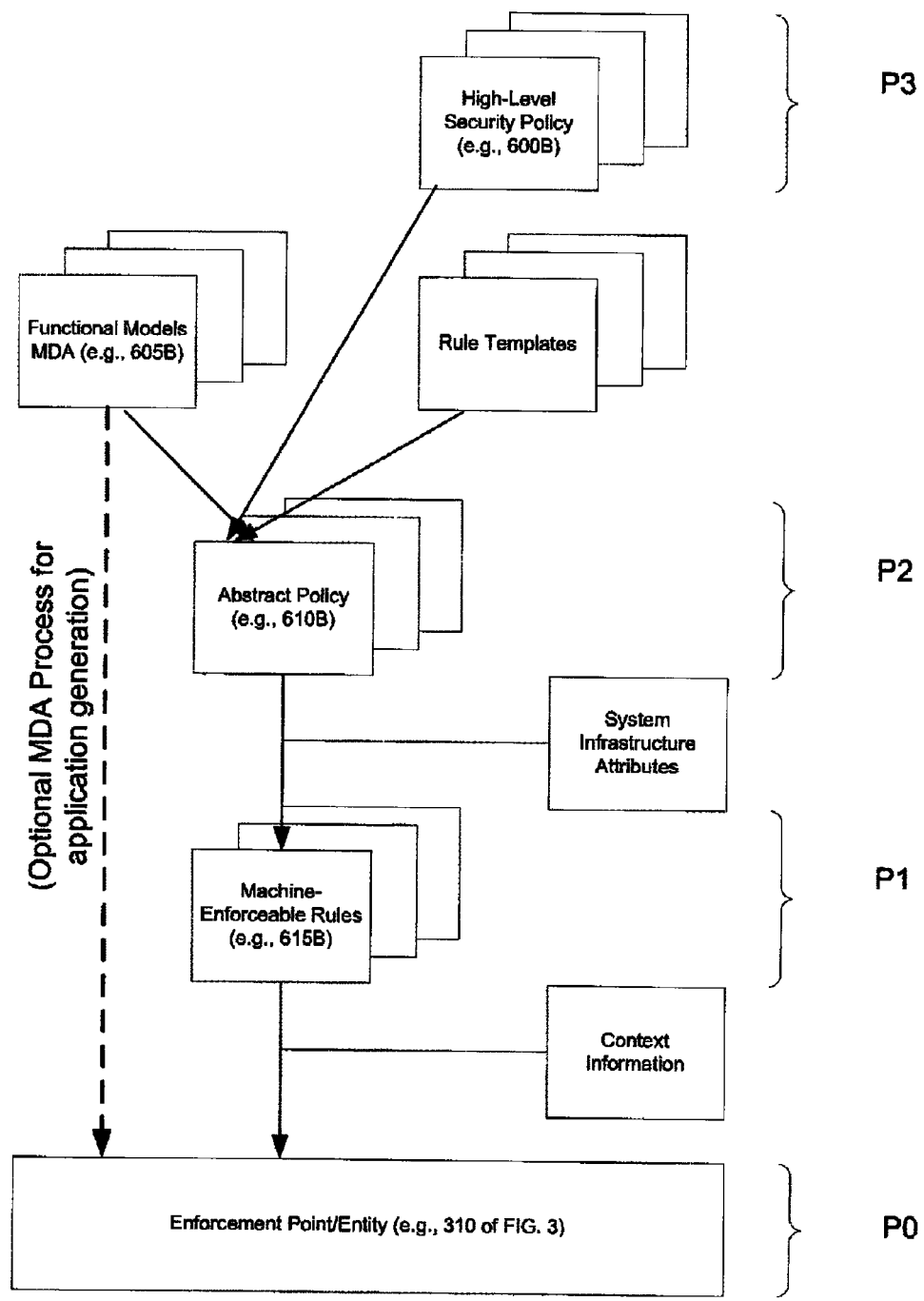
FIG. 6C illustrates transformations associated with the rule generation process of FIGS. 6A/6B according to an embodiment of the present invention.

FIG. 6C illustrates transformations associated with the rule generation process of FIGS. 6A/6B according to an embodiment of the present invention. FIG. 6C has been provided to show how the P3-P0 layers of FIG. 5B are transformed during the process of FIGS. 6A/6B. Accordingly, referring to FIG. 6C, the high-level security policy P3 is received (e.g., 600B of FIG. 6B) and used along with the functional model (e.g., 605B of FIG. 6B) and one or more pre-configured templates to generate an abstract policy or infrastructure neutral model P2 (610B of FIG. 6B). Next, a plurality of low-level, machine-enforceable rules P1 are generated by iteratively filling the abstract policy P2 with system infrastructure attributes from the functional model. Next, if applicable, context information is added to the plurality of machine-enforceable rules. Context information is discussed in greater detail below. The plurality of machine-enforceable rules can then be distributed to an enforcement entity and executed at run-time P0 to control security policies. Also illustrated in FIG. 6C is an optional step where the functional model can be further used at the enforcement entity to control application generation.

Example Implementations of the Process of FIG. 6B

Detailed examples of the process of FIG. 6B will now be described. Below, a number of DAC system examples are provided, followed by a number of MAC system examples.

Please note that in most middleware platforms the operation name for a sender to invoke an operation and for a receiver to receive this operation invocation is the same. E.g. if a sender invokes "send", then the operation name on the receiver's side is "send" as well. For the sake of a better illustration of the invention and for the price of technical correctness we call the operation of the receiving side not "send" as technically correct for most middleware platforms, but "receive".

DAC Example 1

In a first example, at step 600B of FIG. 6B, the policy node 105 receives a high-level security policy for a DAC system indicating that the low-level or machine-enforceable security rules shall allow all communications described in the functional model. Accordingly, in step 605B, the policy node 105 determines the functional model. For this example, assume that the functional model has been pre-defined by a system architect, and includes senders S1 and S2 and receivers R1 and R2, and that the potential communications between S1/S2/R1/R2 are as follows:

---
Sender S1 can send information to R1
Sender S2 can send information to R1 and R2
Receiver R1 can receive information from S1 and S2
Receiver R2 can receive information from S2

---

Functional Model Example 1

Figure 7:
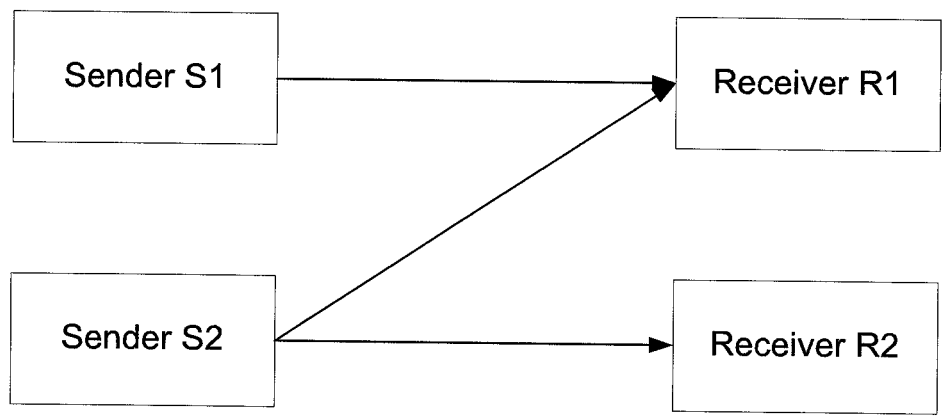
FIG. 7 illustrates communication paths in an IT system based on a functional model according to an embodiment of the present invention.

The functional model example 1 is illustrated in FIG. 7. Next, after the functional model is determined at step 605B, the policy node 105 loads one or more pre-configured templates for governing access permissions between a sender and receiver in an IT system. Because the high-level security policy is to allow all communications described in the functional model in this example, only the templates for permitting send/receive operations need be used in step 610B. As noted above, the policy node 105 can reach the conclusion as to which templates to load (and also how to fill those templates) based on the high-level security policy, which is interpreted or "translated" based on pre-defined objects or model elements having associated properties, as defined by the meta-model M2 layer, and present within the high-level security policy. In other words, the P3 model/layer is interpreted to determine (i) which templates to load and (ii) how to fill those templates. Accordingly, the following rule templates are loaded at step 610B:

---
Send     (client.name == <client.name>)&(target.name == <target.name>)&(operation.name == send): allow;
Receive  (client.name == <client.name>)&(target.name == <target.name>)&(operation.name == receive): allow;

---

DAC Rule Templates Example 1

Thus, the send and receive templates in the DAC rules templates Example 1 are selected (for example, from a pre-built template store) based on the information in the P3 model. Next, in step 615B, the policy node 105 launches an iterative rule-generation process to generate the machine-enforceable rules that will satisfy the high-level security policy from step 600B. For example, the iterative rule-generation process may be performed in accordance with FIG. 8.

Figure 8:
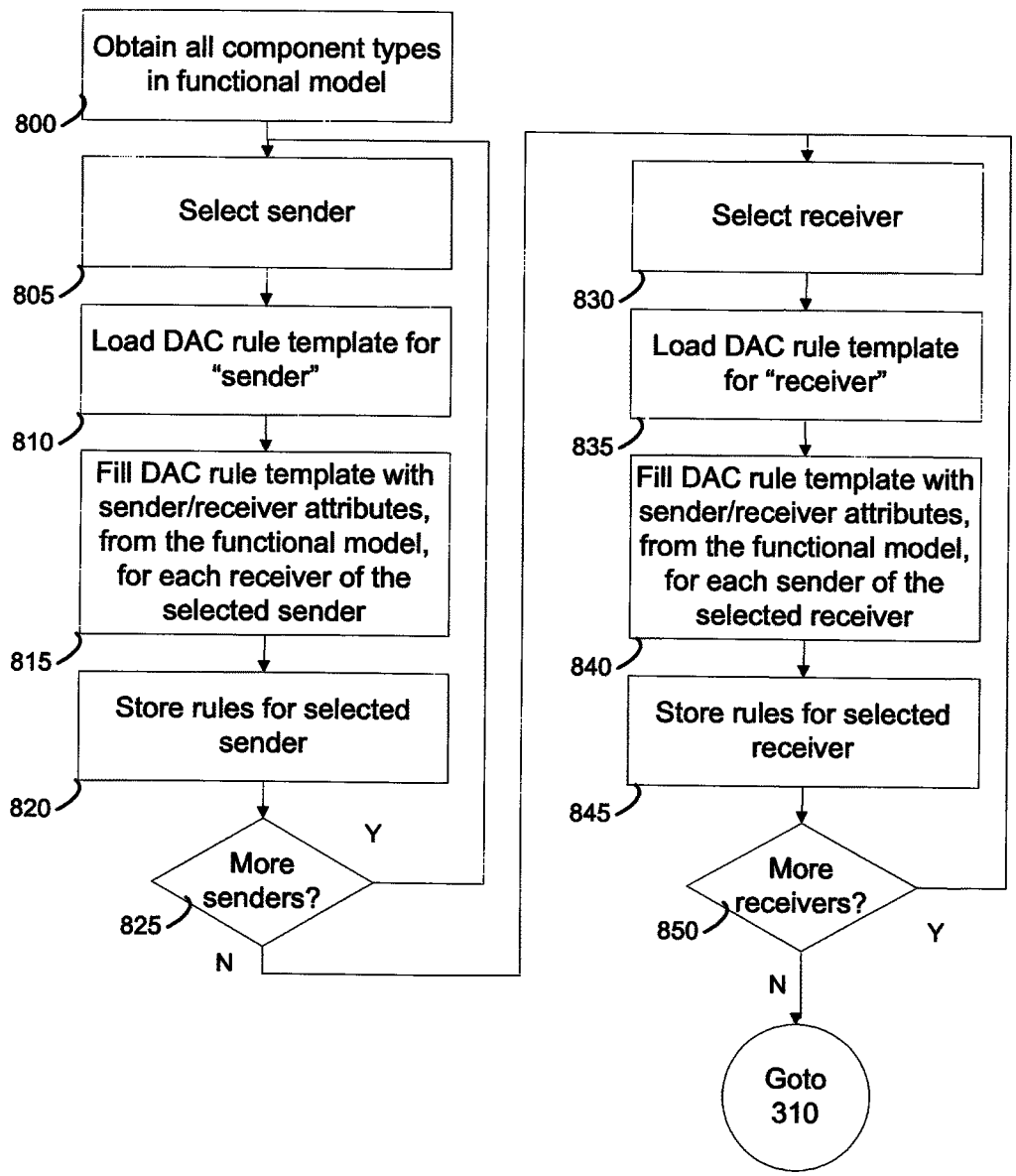
FIG. 8 illustrates a discretionary access control (DAC) rule generation process according to an embodiment of the present invention.

Referring to FIG. 8, in step 800, the functional model (F0-F3) is analyzed to determine all component types within the IT system. Accordingly, the policy node 105 populates a list of senders and receivers of the IT system in step 800. For example, as noted above, the IT system includes senders S1/S2 and receivers R1/R2 in this example (note that the terms S1/S2/R1/R2 are used for purposes unrelated to the matrix in FIG. 4B).

Next, the policy node 105 selects a first sender from the list of senders in step 805 (i.e., S1 and S2). For example, assume that the policy node selects sender S1. In step 810, the policy node 105 loads the DAC rule template for a "send" operation. Accordingly, the policy node 105 loads the "send" template from the DAC rule template Example 1 (above). Next, the policy node 105 fills the "send" template with sender/receiver attributes, from the functional model, for each receiver of the selected sender. As illustrated in FIG. 7 and discussed above, sender S1 can communicate with receiver R1 only. Accordingly, in step 815, the following rule is generated:
(client.name==S1)&(target.name==R1)&(operation.name==send): allow;

DAC Rule for Sender S1

After generating the rule(s) in step 815, while not shown in FIG. 8, the policy node 105 can also generate supplemental rules (e.g., permission for S1 to access a call/find receiver or discovery server to acquire R1's address, etc.) and the generated rule(s) is stored in memory, for example, in a security rule repository (RR) in step 820. After storing the generated rule(s) in step 820, the policy node 105 determines whether any additional senders require rule generation in 825. Because sender S2 has not yet been evaluated, the process returns to step 805 where sender S2 is selected. The process of FIG. 8 re-executes steps 810 and 815 for sender S2, where the following rules (and also, possibly, supplemental rules) are generated:

---
Rule #1  (client.name == S2)&(target.name == R1)&(operation.name == send): allow;
Rule #2  (client.name == S2)&(target.name == R2)&(operation.name == send): allow;

---

DAC Rules for Sender S2

After storing the rules in step 820, the policy node 105 determines no more senders require rule generation in step 825 and the process of FIG. 8 advances to step 830. In step 830, the policy node 105 selects a first receiver from the list of receivers (i.e., R1 and R2). For example, assume that the policy node selects receiver R1. In step 835, the policy node 105 loads the DAC rule template for a "receive" operation. Accordingly, the policy node 105 loads the "receive" template from the DAC rule template Example 1 (above). Next, the policy node 105 fills the "receive" template with sender/receiver attributes, from the functional model, for each sender of the selected receiver. As illustrated in FIG. 7 and discussed above, sender R1 can receive from either S1 or S2. Accordingly, in step 840, the following rules are generated:

---
Rule #1  (client.name == R1)&(target.name == S1)&(operation.name == receive): allow;
Rule #2  (client.name == R1)&(target.name == S2)&(operation.name == receive): allow;

---

DAC Rules for Receiver R1

After generating the rule(s) in step 840, while not shown in FIG. 8, the policy node 105 can optionally generate supplemental rules and the generated rules are stored in memory (e.g., in a security rule repository (RR)) in step 845. After storing the generated rule(s) in step 845, the policy node 105 determines whether any additional senders require rule generation in 850. Because receiver R1 has not yet been evaluated, the process returns to step 830 where receiver S2 is selected. The process of FIG. 8 re-executes steps 835 and 840 for receiver R2, where the following rule is generated: (client.name==R2)&(target.name==S2)& (operation.name==receive): allow;

DAC Rule for Receiver R2

After storing the rules in step 845, the policy node 105 determines no more receivers require rule generation in step 850 and the process of FIG. 8 terminates. Accordingly, after FIG. 8 completes execution, the security RR is as follows (e.g., shown at the P2 abstract policy layer of abstraction—the technology-neutral S1/S2/R1/R2 may be replaced by technology-specific attributes such as X.509 DNs to reach the P1 policy layer of abstraction):

Rule #1 (client.name == S1)&(target.name == R1)&(operation.name == send): allow;
Rule #2 (client.name == S2)&(target.name == R1)&(operation.name == send): allow;
Rule #3 (client.name == S2)&(target.name == R2)&(operation.name == send): allow;
Rule #4 (client.name == R1)&(target.name == S1)&(operation.name == receive): allow;
Rule #5 (client.name == R1)&(target.name == S2)&(operation.name == receive): allow;
Rule #6 (client.name == R2)&(target.name == S2)&(operation.name == receive): allow;

Security RR for DAC Example 1

As will be appreciated, at step 310 of FIG. 3, the security RR may be distributed to an enforcement entity (e.g., middleware bus 130) for enforcement.

DAC Example 2

In DAC Example 1, the machine-enforceable rules were generated based on the (i) pre-configured rule templates and (ii) the functional model for the system. However, in other embodiments of the present invention, additional "context" information can be used in the rule generation process. As used herein, context information is all run time information (e.g., information whose exact value is unknown prior to evaluation/enforcement) which could be used for the evaluation of the policy. For example, context information can include (i) calendar information (e.g., time of day, day of week, etc.), (ii) usage history information (e.g. to be used for a Chinese Wall security model), (iii) geographical information, (iv) network related information (e.g. IP addresses, domain names, access technologies), (v) organizational information (e.g. job roles, ranks) (vi) security technology related information (crypto used for access), (vii) context in a work flow, (viii) situational information like threat level, (ix) environmental information, (x) information about the arguments of an invocation or (xi) the information exchanged and/or (xii) any other type of run-time information. For example, the (i) calendar information may be that senders can only send on Monday through Friday between 9 am and 5 pm. In another example, the (ii) usage history information can include a so called Chinese Wall such that each sender or receiver can only access other entities if there is no conflict of interest with any entity it has accessed before.

It is esp. possible to use content information as context for security enforcement. This includes for example the arguments of an invocation or transaction, or information sent in a message.

For example, assume that the high-level security policy from DAC Example 1 (i.e., "the low-level or machine-enforceable security rules shall allow all communications described in the functional model") is modified to include calendar information context. In particular, assume that the high-level security policy is modified such that the low-level or machine-enforceable security rules shall allow all communications described in the functional model only between 9 am and 5 pm. With this context, the DAC rule templates for send/receive would be modified to include a time condition as follows:

Send (client.name)&(target.name)&(time.office_hours)& (operation.name == send): allow;
Receive (client.name)&(target.name)&(time.office_hours)& (operation.name == receive): allow;

DAC Rule Templates Example 2

Thus, assuming that this is the only modification to DAC Example 1, and that office hours are the same for each client/target (e.g., it will be appreciated that different clients/targets can have different office hours), the security RR for DAC Example 2 would be as follows:

Rule #1 (client.name == S1)&(target.name == R1)&(time == [9:00 <= time <= 5:00 PM])&(operation.name == send): allow;
Rule #2 (client.name == S2)&(target.name == R1)& (time == [9:00 <= time <= 5:00 PM])&( (operation.name == send): allow;
Rule #3 (client.name == S2)&(target.name == R2)& (time == [9:00 <= time <= 5:00 PM])&( (operation.name == send): allow;
Rule #4 (client.name == R1)&(target.name == S1)& (time == [9:00 <= time <= 5:00 PM])&( (operation.name == receive): allow;
Rule #5 (client.name == R1)&(target.name == S2)& (time == [9:00 <= time <= 5:00 PM])&( (operation.name == receive): allow;
Rule #6 (client.name == R2)&(target.name == S2)& (time == [9:00 <= time <= 5:00 PM])&( (operation.name == receive): allow;

Security RR for DAC Example 2

DAC Example 3

In DAC Example 2, the context information was time of day, which is readily available at nearly any computing entity. However, as mentioned briefly in DAC Example 2, the context information may be relatively complex, such as a usage history of a particular sender or receiver, or the position in an enterprise architecture workflow. As will be appreciated by one of ordinary skill in the art, the usage history information and workflow position information may not necessarily be available at the policy node 105 or at the enforcement entity. Accordingly, the policy node 105 may configure the rules to be dependent upon context information that needs to be queried from another network entity (i.e., other than the enforcement entity or middleware), such as an orchestration server (e.g. Business Process Execution Language (BPEL)), to acquire certain context information at run-time. The enforcement entity may then take the context information into account during rule enforcement.

MAC Example 1

The above-examples given with respect to FIG. 6B have been based on the DAC security model. Below, MAC implementations will be described with respect to FIG. 6B.

In MAC, the machine-enforceable rules are generated in terms of clearances or classifications on both sides of a given call (i.e., the sender and receiver).

In a first MAC example, at step 600B of FIG. 6B, the policy node 105 receives a high-level security policy to enforce Mandatory Access Control (MAC), also called Multi Level Security (MLS) according to the BellLaPadula security model. MAC is implemented based on two properties, indicating that the low-level or machine-enforceable security rules shall not allow "read-ups" or "write-downs". A read-up means a lower-level security clearance client attempting to read from a server with higher-level security clearance, and a write-down means a higher-level security clearance sender attempting to write ("send") to a receiver with a lower-level security clearance. Accordingly, in step 605B, the policy node 105 determines the functional model. For this example, assume that the functional model has been pre-defined by a system architect, and includes senders S1 and S2 and receivers R1 and R2, and that the security clearances of S1/S2/R1/R2 are as follows:

| | |
|---|---|
| Sender S1 | Secret |
| Sender S2 | Top Secret |
| Receiver R1 | Secret |
| Receiver R2 | Top Secret |

Functional Model Example 2

This example has been limited to a description of senders actively sending information to receivers. Thus, this example does not describe entities actively obtaining information by invoking "read" calls. However, it will be appreciated that other embodiments of the present invention can be directed to entities that actively obtain information by invoking read calls.

Next, after the functional model is determined at step 605B, the policy node 105 loads one or more pre-configured templates for governing access permissions between in an IT system. Because the high-level security policy is to deny write-downs and read-ups in the functional model, the following rule templates are loaded at step 610B:

| | |
|---|---|
| Sender side | (client.clearance <= target.clearance)&(operation.name == send): allow; |
| Sender side | (client.clearance > target.clearance)&(operation.name == send): deny; |
| Server side | (client.clearance >= target.clearance)&(operation.name == read): allow; |
| Server side | (client.clearance < target.clearance)&(operation.name == read): deny; |

MAC Rule Templates Example 1

Thus, the send and read templates in the MAC rules templates Example 1 are selected based on the P3 high-level security policy model. In an example, the server side rule will not necessarily be used, since senders are actively sending information to receivers, but no clients are using the "read" operation on a server. However, it will be appreciated that other embodiments of the invention can be directed to client-based read invocations.

Next, in step 615B, the policy node 105 launches an iterative rule-generation process to generate the machine-enforceable rules (P1) based on P2 (step 610B) to satisfy the high-level security policy from step 600B. Again, as noted above, in other embodiments of the present invention steps 610B and 615B can be consolidated such that the P1 rules can be generated directly without first generating P2. For example, the iterative rule-generation process may be performed in accordance with FIG. 9.

Figure 9:
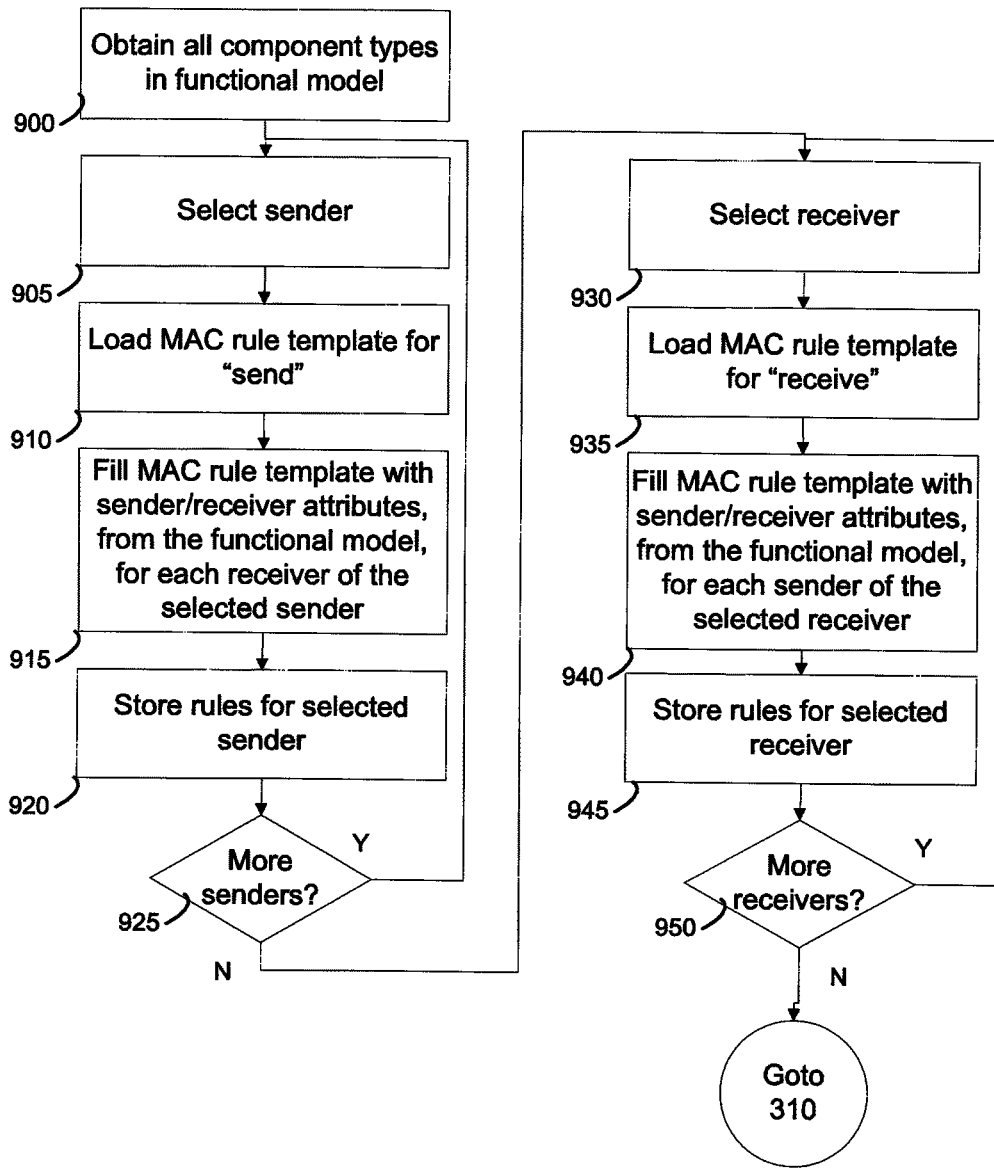
FIG. 9 illustrates a mandatory access control (MAC) rule generation process according to an embodiment of the present invention.

Referring to FIG. 9, in step 900, the functional model is analyzed to determine all component types within the IT system, and their associated clearance levels. Accordingly, the policy node 105 populates a list of senders and receivers of the IT system, and their associated clearance levels, in step 900 (e.g., as noted above in functional model example 2).

Next, the policy node 105 selects a sender from the list of senders in step 805 (i.e., S1 and S2). For example, assume that the policy node selects sender S1. In step 910, the policy node 105 loads the MAC rule template for a "send" operation. Accordingly, the policy node 105 loads the "send" template from the MAC rule template Example 1 (above). Next, the policy node 105 fills the "send" template with sender/receiver attributes, from the functional model, for each receiver of the selected sender based on an associated clearance level. As noted above, the policy node 105 can reach the conclusion as to which templates to load (and also how to fill those templates) based on the high-level security policy, which is interpreted or "translated" based on pre-defined objects or model elements having associated object properties, as defined by the meta-model M2 layer, and present within the high-level security policy. Accordingly, in step 815, the following rules are generated based on the object properties associated with the high-level security policy for this example:

| | |
|---|---|
| Rule #1 | (S1[Secret] == R1[Secret])&(operation.name == send): allow; |
| Rule #2 | (S1[Secret] <= R2[Top Secret])&(operation.name == send): allow; |

MAC Rule for Sender 51

After generating the rule(s) in step 915, while not shown in FIG. 9, the policy node 105 can also generate supplemental rules (e.g., permission for S1 to access a call/find receiver or discovery server to acquire R1's address, etc.) and the generated rules are stored in memory, for example, in a security rule repository (RR) in step 920. After storing the generated rules in step 920, the policy node 105 determines whether any additional senders require rule generation in 925. Because sender S2 has not yet been evaluated, the process returns to step 905 where sender S2 is selected. The process of FIG. 9 re-executes steps 910 and 915 for sender S2, where the following rules (and also, possibly, supplemental rules) are generated:

| | |
|---|---|
| Rule #1 | (S2[Top Secret] >= R1[Secret])&(operation.name == send): deny; |
| Rule #2 | (S2[Top Secret] == R2[Top Secret])&(operation.name == send): allow; |

MAC Rule for Sender S2

After storing the rules in step 920, the policy node 105 determines no more senders require rule generation in step 925 and the process of FIG. 9 advances to step 930.

In this example, there are no rules for the receivers, resulting in a default allow (e.g., if a sender has authority to send, then a receiver is presumed to have the authority to receive). In other words, receivers are allowed to receive all data. This can be a property of the MAC model with senders and receivers.

Accordingly, after FIG. 9 completes execution, the security RR is as follows:

| | |
|---|---|
| Rule #1 | (S1[Secret] == R1[Secret])&(operation.name == send): allow; |
| Rule #2 | (S1[Secret] <= R2[Top Secret])&(operation.name == send): allow; |
| Rule #3 | (S2[Top Secret] >= R1[Secret])&(operation.name == send): deny; |
| Rule #4 | (S2[Top Secret] == R2[Top Secret])&(operation.name == send): allow; |

Security RR for MAC Example 1

As will be appreciated, at step 310 of FIG. 3, the security RR may be distributed to an enforcement entity (e.g., middleware bus 130) for enforcement.

In this example, the clearances for senders and receivers are hard coded in the policy itself. This is just one of many approaches to define security rules implementing the high-level security policy. For example, if the authentication mechanism used does not directly support clearances, the security policy can be expanded to include identity based rules, listing all senders and receivers which are allowed to communicate (e.g., similar to the DAC-based rules described above). If other authentication and authorization mechanisms might directly support clearances, then rules directly comparing clearances might be used.

The example also only generates middleware layer access control rules. The invention is also able to generate crypto configurations to protect the data communications are application layer rules, for example to generate only limited sets of XML data from databases, based on the receiver's clearance.

MAC Example 2

As discussed above with respect to DAC Examples 2 and 3, context information may be taken into consideration by the policy node 105 so as to expand upon the robustness of the generated rules (e.g., a usage history of a user, calendar information, etc., e.g., so as to generate feature-rich or fine-grained rules).

For example, assume that the high-level security policy from MAC Example 1 (i.e., "the low-level or machine-enforceable security rules shall not allow write-downs or read-ups") is modified to include calendar information context. In particular, assume that the high-level security policy is modified such that shall not allow write-downs or read-ups only between 9 am and 5 pm. With this context, the MAC rule templates for send/receive would be modified to include a time condition as follows:

| | |
|---|---|
| Sender side | (client.clearance <= target.clearance)&(operation.name == send): allow; |
| Sender side | (client.clearance > target.clearance)&(time == office_hours)&(operation.name == send): deny; |
| Server side | (client.clearance >= target.clearance)&(operation.name == read): allow; |
| Server side | (client.clearance < target.clearance)&(time == office_hours)&(operation.name == read): deny; |

MAC Rule Templates Example 2

Thus, assuming that this is the only modification to MAC Example 1, the security RR for MAC Example 2 would be as follows:

| | |
|---|---|
| Rule #1 | (S1[Secret] == R1[Secret])&(operation.name == send): allow; |
| Rule #2 | (S1[Secret] <= R2[Top Secret])&(operation.name == send): allow; |
| Rule #3 | (S2[Top Secret] >= R1[Secret])&(time == [9:00 <= time <= 5:00 PM])&(operation.name == send): deny; |
| Rule #4 | (S2[Top Secret] == R2[Top Secret])&(operation.name == send): allow; |

Security RR for MAC Example 2

While above-described embodiments of the present invention have been generally described with respect to SOA, it will be appreciated that other embodiments of the present invention may be directed to any type of IT infrastructure, for example data centric or message based systems, databases or application level policy enforcement. Further, while the examples given above describe the machine-enforceable rules in accordance with PDL, other embodiments can be directed towards other rule configurations, such as eXtensible Markup Language (XML) Metadata Interchange (XMI).

While the rule-generation examples provided above have been directed to a number of DAC and MAC examples, both with and without context information being considered, it will be appreciated that other embodiments of the present invention can be directed to other rule implementations (e.g., Chinese Wall, Biba, Clark Wilson, etc.). It will be readily apparent how other embodiments of the invention can be modified so as to conform with the generation of different types of rules.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A policy management system, comprising:
at least one policy management device including a processor, memory having a computer executable program and a policy input and/or a template stored and/or a functional model therein, the at least one policy management device being configured to manage the policy input and/or the template and/or the functional model when the computer executable program is executed by the processor;
at least one policy enforced device that includes a processor, memory having a computer executable program and is directly or indirectly connected to the policy management device via a network and that is configured when the computer executable program is executed by the processor, such that at least a part of the functional model managed by the policy management device reflects the functional features/behaviors of the at least one policy enforced device;
at least one policy enforcement device that is a part of or connected to the at least one policy enforced device and/or at least one policy decision device and is configured, when the respective executable program is executed by the respective processor, to execute policy enforcement on the policy enforced device, the policy enforcement device being a part of or connected to the at least one policy enforced device and/or at least one policy decision device; and
the at least one policy decision device that is configured to receive at least one machine-enforceable rule and/or configuration from the at least one policy management device,
wherein the at least one policy management device receives a policy input loaded from the memory, or entered by a user via a user interface, indicating at least one input policy for the at least one policy enforced device, the received input policy relating to non-functional system attributes for the at least one policy enforced device and received in a format that is not machine-decidable at a policy decision entity and is not machine-enforceable at a policy implementation entity of the at least one policy enforced device,
wherein the at least one policy management device determines at least one functional model for the at least one policy enforced device relevant for the received input policy based on which functional system attributes are indicated by the input policy and/or configuration template, the at least one functional model indicating functional system attributes used to iteratively fill attribute placeholders,
wherein the at least one policy management device loads at least one pre-configured rule and/or configuration template from the memory to the processor,
wherein the at least one policy management device automatically or semi-automatically generates at least one machine-enforceable rule and/or configuration that is in a ready to implement format in a manner compliant with the received input policy by selecting the at least one pre-configured rule and/or configuration template corresponding to the input policy, and iteratively fills attribute placeholders of the at least one pre-configured rule and/or configuration template with functional system attributes values indicated by the at least one functional model, wherein the at least one machine-enforceable rule and/or configuration, which indicates at least one condition and at least one action is an output that is produced by the processor from the received policy input, the at least one functional model, and/or the at least one pre-configured rule and/or configuration template,
wherein the at least one policy management device transmits the at least one machine-enforceable rule and/or configuration to the at least one policy decision device that determines the result(s) of the at least one pre-configured rule and/or configuration template for the policy enforced device, and
wherein the at least one policy enforcement device, when a policy relevant event occurs, instructs the at least one policy decision device to determine the result of the at least one condition of the transmitted at least one machine-enforceable rule and/or configuration for implementing the policy input for the at least one policy enforced device, thereby modifying an operation of the at least one policy enforced device or the at least one policy enforcement device to execute the at least one action.

2. The policy management system according to claim 1, wherein the at least one policy management device transmits the at least one machine-enforceable rule and/or configuration to the at least one policy decision device which determines which actions should be or should not be executed by the at least one policy enforcement device, which implements the at least one machine-enforceable rule for communicating at the at least one policy enforced device.

3. The policy management system according to claim 1, wherein the pre-configured rule and/or configuration template is implemented as a model-to-model transformation, a model-to-text transformation, hard-coded security models of the received policy input, or hard-coded processor instructions.

4. The policy management system according to claim 1, wherein the pre-configured rule and/or configuration template specifies the mappings, transformations or instructions how the at least one machine-enforceable rule and/or configuration is produced from the received policy input.

5. The policy management system according to claim 4, wherein the pre-configured rule and/or configuration template specifies which attributes of the received policy input are to be filled in using which functional system attributes.

6. The policy management system according to claim 1, wherein the pre-configured rule and/or configuration template and/or the at least one policy input and/or functional model each contain reference information that indicates a reference to information contained in the pre-configured rule and/or configuration template and/or in the at least one policy input and/or functional model.

7. The policy management system according to claim 6, wherein the reference to the information contained in the pre-configured rule and/or configuration template and/or in the at least one policy input and/or functional model directly indicates the referenced information in the pre-configured rule and/or configuration template and/or in the at least one policy input and/or functional model.

8. The policy management system according to claim 6, wherein the reference to the information contained in the pre-configured rule and/or configuration template and/or in the at least one policy input and/or functional model indicates a mapping element in the pre-configured rule and/or configuration template and/or in the at least one policy input and/or functional model, which reference information that indicates an indirect reference to information contained in the pre-configured rule and/or configuration template and/or in the at least one policy input and/or functional model.

9. The policy management system according to claim 1, wherein the at least one functional model specifies at least one subset of the model elements of the at least one functional model, the subset indicating the model elements available as inputs.

10. The policy management system according to claim 1, wherein the received policy input includes at least one of organization-specific, industry-specific, market-specific, user-specific, technical architecture-specific, enterprise architecture-specific, or business architecture-specific policy input.

11. The policy management system according to claim 1, wherein the received policy input includes monitoring, alarm and logging policies, which include conditions and actions that trigger monitoring alerts to be created, log entries to be created, and/or alarms to be triggered.

12. The policy management system according to claim 1, wherein the at least one policy decision device is not collocated with the at least one policy enforcement device and communicates with the at least one policy enforcement device on or connected with another policy enforced device and that makes a decision based on the at least one action, or that is collocated on the same policy enforced device with the at least one policy enforcement device that enforces the at least one machine-enforceable rule and/or configuration.

13. The policy management system according to claim 1, wherein functional system attribute values that are filled by the at least one policy management device include values that are available or known before the at least one machine-enforceable rule and/or configuration is decided at the at least one policy decision device and/or enforced at the at least one policy enforcement device.

14. The policy management system according to claim 1, wherein functional system attributes values that are filled by the at least one policy management device include values that are not available or known until the at least one machine-enforceable rule and/or configuration is decided at the at least one policy decision device and/or enforced at the at least one policy enforcement device.

15. The policy management system according to claim 1, wherein the functional system attributes specify attribute values, calculation result values, and/or comparison values of the at least one template that is filled in.

16. The policy management system according to claim 12, wherein the at least one action includes at least one of a request for the at least one policy enforced device or policy enforcement device to proceed with the policy relevant event, a request for the at least one policy enforced device or policy enforcement device not to proceed with the policy relevant event, a request for the at least one policy enforced device or policy enforcement device to remove some or all of a content transmitted as part of the policy relevant event, a request for the at least one policy enforced device or policy enforcement device to proceed with the policy relevant event but to modify some or all of the content of transmitted as part of the policy relevant event, a request for the at least one policy enforced device or policy enforcement device to create a log entry about subsequent requests available on the at least one policy enforced device, and a request for the at least one policy enforced device or policy enforcement device to raise monitoring alerts and/or alarms.

17. The policy management system according to claim 1, wherein the input policy includes an indication that facilities the processor to select a particular template, so that the processor loads at least one template needed to process a particular input policy, and does not load a template not needed to process the particular input policy.

18. The policy management system according to claim 1, wherein the policy enforcement device is connected to the at least one policy enforced device via the network.

19. The policy management system according to claim 1, wherein the at least one policy decision device is included in the at least one policy enforced device.

20. The policy management system according to claim 1, wherein the at least one policy decision device is included in the at least one policy enforcement device.

* * * * *